(12) United States Patent
Fisher

(10) Patent No.: US 11,981,357 B2
(45) Date of Patent: May 14, 2024

(54) SYSTEM AND METHOD FOR VEHICLE OPERATION

(71) Applicant: Transportation IP Holdings, LLC, Norwalk, CT (US)

(72) Inventor: Kevin Michael Fisher, North East, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 170 days.

(21) Appl. No.: 17/455,395

(22) Filed: Nov. 17, 2021

(65) Prior Publication Data

US 2022/0073111 A1 Mar. 10, 2022

Related U.S. Application Data

(63) Continuation-in-part of application No. 16/732,697, filed on Jan. 2, 2020, now Pat. No. 11,299,183, which is a continuation of application No. 14/253,950, filed on Apr. 16, 2014, now abandoned.

(51) Int. Cl.
*B61C 17/12* (2006.01)
(52) U.S. Cl.
CPC ............... *B61C 17/12* (2013.01); *Y02T 30/00* (2013.01)
(58) Field of Classification Search
CPC ................................ B61C 17/12; Y02T 30/00
USPC ........................................................ 701/123
See application file for complete search history.

(56) References Cited

U.S. PATENT DOCUMENTS

| | | | |
|---|---|---|---|
| 5,820,172 A * | 10/1998 | Brigham | B60W 50/0097 318/143 |
| 2003/0178533 A1 | 9/2003 | Kornick et al. | |
| 2008/0195432 A1 * | 8/2008 | Fell | G06Q 30/0206 705/16 |
| 2011/0257869 A1 * | 10/2011 | Kumar | B61L 25/025 701/103 |
| 2012/0089537 A1 | 4/2012 | Cooper et al. | |
| 2012/0296545 A1 | 11/2012 | Cooper et al. | |
| 2013/0158848 A1 | 6/2013 | Gallagher et al. | |
| 2014/0033948 A1 | 2/2014 | Foege | |
| 2014/0083078 A1 * | 3/2014 | Dinu | F02C 3/22 60/776 |
| 2014/0257612 A1 * | 9/2014 | Liu | B60L 15/2009 903/903 |
| 2014/0353434 A1 | 12/2014 | Otsubo et al. | |
| 2014/0358336 A1 | 12/2014 | Otsubo et al. | |

(Continued)

*Primary Examiner* — Mahmoud S Ismail
(74) *Attorney, Agent, or Firm* — McCoy Russell LLP

(57) ABSTRACT

A system, in a vehicle consist configured for dual fuel operation and comprising at least one fuel car operably connectable to at least one powered vehicle via a fuel distribution path, includes an energy management processing unit. The energy management processing unit is configured to obtain a first cost of a first fuel, obtain a second cost of a second fuel, and determine a proportional ratio of the first fuel and the second fuel for each of plural power settings available for use during performance of a mission along a route. The energy management processing unit is also configured to determine a trip plan specifying power settings for corresponding plural sections of the route to perform the mission using the first cost, the second cost, and the proportional ratio for the power settings to optimize a total combined cost of fuel used during performance of the mission.

9 Claims, 5 Drawing Sheets

(56) References Cited

U.S. PATENT DOCUMENTS

| | | | |
|---|---|---|---|
| 2014/0365049 A1* | 12/2014 | Cook | B61C 17/12 |
| | | | 701/20 |
| 2015/0021444 A1 | 1/2015 | Goergen | |
| 2015/0057848 A1 | 2/2015 | Fanara et al. | |
| 2016/0016596 A1 | 1/2016 | Naylor | |

* cited by examiner

SYSTEM AND METHOD FOR VEHICLE OPERATION

CROSS REFERENCE TO RELATED APPLICATIONS

The present application is a continuation-in-part of U.S. Non-Provisional patent application Ser. No. 16/732,697 entitled "SYSTEM AND METHOD FOR VEHICLE OPERATION" and filed on Jan. 2, 2020. U.S. Non-Provisional patent application Ser. No. 16/732,697 is a continuation of U.S. Non-Provisional patent application Ser. No. 14/253,950 entitled "SYSTEM AND METHOD FOR VEHICLE OPERATION" and filed on Apr. 16, 2014.

TECHNICAL FIELD

The present description relates generally to a multi-fuel engine.

BACKGROUND/SUMMARY

A vehicle system may include one or more powered vehicles that may be mechanically linked (directly or indirectly) to non-powered vehicles. The powered and non-powered vehicles of the vehicle system may travel as a group along a designated route. In cases where the vehicle system includes multiple powered vehicles, the vehicle system may coordinate operations of the powered vehicles to move the vehicle system. For example, a rail vehicle system may include a powered unit consist that has one or more powered units mechanically coupled to one or more non-powered rail cars. Vehicles in a consist may include a lead powered unit and one or more remote powered units and/or trail powered units. Remote powered units are those that are spaced apart from the lead powered unit by one or more non-powered vehicles. Trail powered units are those that are in the same powered unit consist as the lead powered unit, and thereby not spaced apart from the lead powered unit by one or more non-powered rail vehicles, but that are subordinate to control by the lead powered unit. The lead vehicle may control operation of one or more remote vehicles.

In certain vehicle systems, fuel cars (a fuel car may also be known as a tender) may be employed to carry fuel and to supply fuel to one or more powered vehicles. For example, syngas, propane, liquid natural gas (LNG), compressed natural gas (CNG), or the like may be employed as a fuel source for one or more powered vehicles. However, LNG and CNG may not be readily available along a route traversed during a mission. Thus, fuel cars may be added to a consist to provide additional fuel carrying capability.

Some or all of the powered units may be configured as multi-fuel vehicles configured to use at least two different fuels. For example, a multi-fuel vehicle may be configured to utilize diesel fuel and natural gas mixed in different proportions based upon a throttle setting. Diesel fuel may provide higher efficiency (e.g., more miles per gallon), but natural gas may be available at a lower cost. Thus, a mission performed by the consist at a maximum or relatively high fuel efficiency may result in a larger fuel cost than desired. Additionally, for example, an operator of a conventional consist may not have access to information collected onboard one or more fuel units and/or access to testing or diagnostic capabilities of the fuel cars. It may be desirable to have a system or method that differs from those that are currently available.

BRIEF DESCRIPTION

In one embodiment, a system in a vehicle consist configured for multi-fuel operation and comprising at least one fuel car operably connectable to at least one powered vehicle via a fuel distribution path includes an energy management processing unit. As used herein, the terms "system," "unit," and "module" may include circuitry, including a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit or system may include a hard-wired device that performs operations based on hard-wired logic of the device. The modules, units, or systems shown in the attached figures may represent the hardware that operates based on software or hardwired instructions, the software that directs hardware to perform the operations, or a combination thereof.

The energy management processing unit is configured to (e.g., via processing circuitry configured to) obtain a first cost of a first fuel, obtain a second cost of a second fuel, and determine a proportional ratio of the first fuel and the second fuel for each of plural power settings available for use during performance of a mission along a route. The energy management processing unit is also configured to determine a trip plan specifying power settings for corresponding plural sections of the route to perform the mission using the first cost, the second cost, and the proportional ratio for each of the power settings to obtain a total combined cost of fuel used during the performance of the mission. The total combined cost of fuel may be optimized, for example, to minimize or reduce a total or overall fuel cost.

In another embodiment, a method (e.g., a method in a vehicle consist configured for multi-fuel operation and comprising at least one fuel car operably connectable to at least one powered vehicle via a fuel distribution path) is provided. The method includes obtaining, with at least one processor, a first cost of a first fuel. The method also includes obtaining, with the at least one processor, a second cost of a second fuel. Also, the method includes determining, with the at least one processor, a proportional ratio of the first fuel and the second fuel for each of plural power settings available for use during performance of a mission along a route. Further, the method includes determining, with the at least one processor, a trip plan specifying power settings for corresponding plural sections of the route to perform the mission using the first cost, the second cost, and the proportional ratio for each of the power settings to obtain a total combined cost of fuel used during the performance of the mission.

In another embodiment, a system (e.g., a system in a vehicle consist configured for multi-fuel operation and comprising at least one fuel car operably connectable to at least one powered vehicle via a fuel distribution path) includes a fuel car information unit and a display unit. The fuel car information unit is configured to obtain fuel car information from at least one of the at least one fuel car. The display unit is configured to be disposed onboard one of the at least one powered vehicle and operably coupled to the fuel car information unit, and is configured to display at least a portion of the fuel car information.

BRIEF DESCRIPTION OF THE DRAWINGS

The inventive subject matter will be better understood from reading the following description of non-limiting embodiments, with reference to the attached drawings, wherein below.

DETAILED DESCRIPTION

Figure 1:
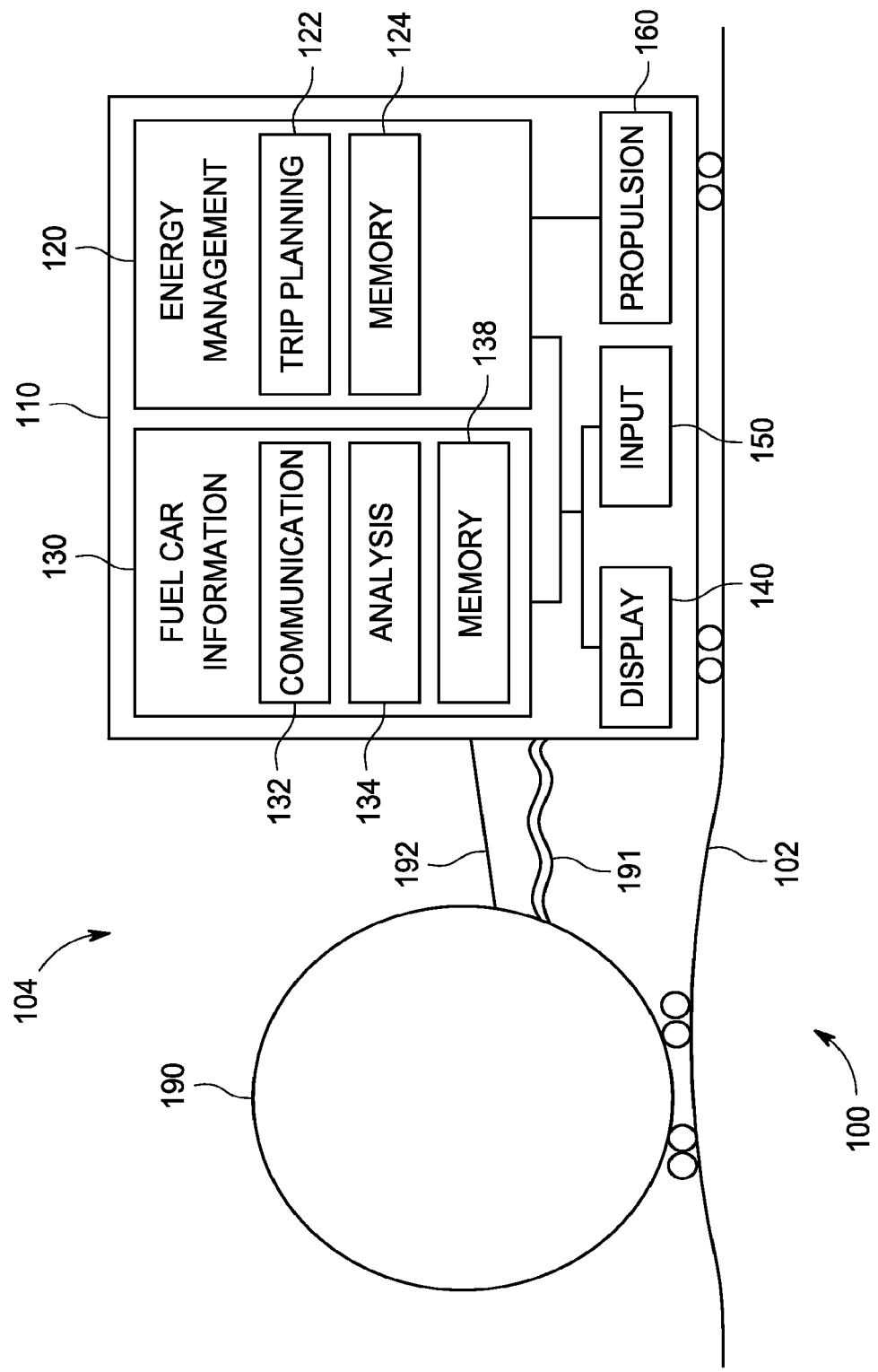
FIG. 1 is a schematic diagram of a transportation system, according to an embodiment of the disclosure.

As used herein, a vehicle consist may be a group of two or more vehicles that are coupled to travel together along a route. Optionally, a vehicle consist may have a single propulsion-generating unit or vehicle. The vehicles in a vehicle consist can be propulsion-generating units (e.g., vehicles capable of generating propulsive force, which also are referred to as propulsion-generating units, powered units, or powered vehicles) that may be in succession and connected together so as to provide motoring and/or braking capability for the vehicle consist. The propulsion-generating units may be connected together with or without other vehicles or cars between the propulsion-generating units. One example of a vehicle consist is a locomotive consist that includes locomotives as the propulsion-generating units. Other vehicles may be used instead of or in addition to locomotives to form the vehicle consist. A vehicle consist can also include non-propulsion generating units, such as where two or more propulsion-generating units are connected with each other by a non-propulsion-generating unit, such as a rail car, passenger car, or other vehicle that cannot generate propulsive force to propel the vehicle consist. A larger vehicle consist, such as a train, can have sub-consists. Specifically, there can be a lead consist (of propulsion-generating units), and one or more remote consists (of propulsion-generating units), such as midway in a line of cars and another remote consist at the end of the train.

The vehicle consist may have a lead propulsion-generating unit and a trail or remote propulsion-generating unit. The terms "lead," "trail," and "remote" are used to indicate which of the propulsion-generating units control operations of other propulsion-generating units, and which propulsion-generating units are controlled by other propulsion-generating units, regardless of locations within the vehicle consist. For example, a lead propulsion-generating unit can control the operations of the trail or remote propulsion-generating units, even though the lead propulsion-generating unit may or may not be disposed at a front or leading end of the vehicle consist along a direction of travel. A vehicle consist can be configured for distributed power operation, wherein throttle and braking commands are relayed from the lead propulsion generating unit to the remote propulsion-generating units by a radio link or physical cable. Toward this end, the term vehicle consist should be not be considered a limiting factor when discussing multiple propulsion-generating units within the same vehicle consist.

A vehicle system may include one or more powered vehicles (or powered units) and one or more non-powered vehicles (or non-powered units). In certain embodiments, the vehicle system is a rail vehicle system that includes one or more locomotives and, optionally, one or more rail cars. In other embodiments, however, the vehicle system may include non-rail type vehicles, including off-highway vehicles (e.g., vehicles that are not designed or allowed by law or regulation to travel on public roads, highways, and the like), automobiles, marine vessels, and the like. In some cases, at least a plurality of the vehicles in a vehicle system may each include a separate vehicle network.

One or more examples of the subject matter described herein provide methods and systems for creating or determining control strategies (e.g., trip plans) for energy management of a consist performing a mission to optimize a power distribution strategy to minimize or reduce a total cost of fuel used (e.g., the sum of the cost of each type of fuel consumed during the mission). Thus, in contrast to conventional systems that seek to maximize or increase fuel efficiency, examples of the inventive subject matter address cost, for example by factoring in the use of different fuels employed for a multi-fuel vehicle. For example, the cost of using diesel, biodiesel, gasoline, kerosene, hydrogenation derived renewable diesel (HDRD), or alcohols as a liquid fuel, and using propane, syngas, natural gas, ammonia, or hydrogen as a gaseous fuel, may provide a cost that may be used to determine or generate a trip plan. For ease and simplicity of explanation, natural gas, and diesel will be used as working examples herein.

In some examples, low notches (or power or throttle settings) may only use diesel fuel and higher notches may use natural gas along with diesel fuel. Depending on the cost differential between the first and second fuels (e.g., diesel and natural gas), a transition from diesel only operation (e.g., low notches) to multi-fuel operation (e.g., higher notches) may provide a significant or substantial total combined fuel cost savings. Examples of the subject matter may employ a cost based algorithm or methodology to determine a trip plan. The determined trip plan may be less efficient from a BTU to HP standpoint or from a total amount of fuel used standpoint, but provide a lower overall fuel cost compared to conventional strategies focused on efficiency. Additionally or alternatively, in some examples, a consist may have both multi-fuel powered vehicles and diesel only powered vehicles. Examples of the present subject matter may preferentially use the multi-fuel vehicles (e.g., a trip plan may prescribe increased tractive effort for multi-fuel vehicles and reduced tractive effort for diesel only vehicles) of the consist when the cost differential between diesel and natural gas is large enough to provide sufficient cost savings.

In various embodiments, an energy management system thus takes into consideration fuel burn rate, but also accounts for types of fuel and cost differential between types of fuel. The system may minimize or otherwise reduce total combined fuel cost when planning a route energy strategy, which may result in a decrease in efficiency. Thus, it may be noted that various embodiments do not have reduction of total fuel consumed as an objective (or primary objective), but instead may be directed to the reduction of cost by varying the proportional allocation or use of two or more different types of fuel.

Additionally or alternatively, various examples of the subject matter provide a human/machine interface (HMI) from an operator of a powered vehicle to a fuel car or fuel tender operably coupled to the powered vehicle. Information may be shared between the fuel car and powered vehicle, which may be displayed or otherwise provided to the operator. Further, in various embodiments, an operator may initiate a self-test of the fuel car from within the powered vehicle. The information may be shared over a conventional functional interface (e.g., an interface that is also configured for the request of fuel from the fuel car in addition to the information shared between the fuel car and the powered vehicle) or may be shared over a dedicated line or channel separate from the conventional functional interface. Thus, various examples provide for diagnostic and/or supervisory communication between a powered vehicle and a fuel car.

At least one technical effect of various examples of the subject matter described herein may include reduced cost for operating a consist having at least one multi-fuel powered vehicle. Another technical effect may include improved flexibility or ability to account for changes in fuel car operational state (e.g., low fuel supply, leak, malfunction, or the like) during performance of a mission. Another technical effect may include improved convenience for testing a consist and/or performing a mission via the use of remote diagnostics or testing of a fuel car from a powered vehicle. Another technical effect may include improved diagnostic capabilities for evaluating fuel car performance before or during performance of a mission. Another technical effect may include improved ability to identify and address any degradations of a fuel car that arise during performance of a mission. Another technical effect may include the reduction or elimination of hardware or features on a fuel car or fuel tender related to a fuel-car based interface.

FIG. 1 illustrates a schematic block diagram of a transportation system 100 formed according to one example of the present inventive subject matter. The transportation system 100 depicted in FIG. 1 includes a consist 104 configured to traverse a route 102, for example to perform a mission. All or a portion of the consist 104 may be scheduled to arrive at one or more destinations along the route 102 pursuant to the mission. In the illustrated example, the consist 104 includes a powered vehicle 110 and a fuel car 190 (also known as a fuel tender). It may be noted that additional powered or un-powered units (e.g., powered vehicles, cargo vehicles, fuel cars) may be included in the consist in various embodiments. Thus, while one powered vehicle and one fuel car is shown in FIG. 1, it should be understood that the consist 104 may include additional vehicles or cars (see, e.g., FIG. 2 and related discussion).

The powered vehicle 110 in the illustrated embodiment is configured as a powered rail vehicle or locomotive, and the route 102 includes one or more railroad tracks. Other types of vehicles or routes may be used in other embodiments. Further, the powered vehicle 110 is configured as a multi-fuel powered vehicle. A dual fuel powered vehicle as used herein may be understood as a vehicle configured to use at least a mixture of a first fuel and a second fuel during operating conditions where combustion is desired. In some examples, the multi-fuel powered vehicle may be configured to use one or either of the first and second fuels alone during combustion conditions. For example, the depicted powered vehicle 110 is configured to use one or more of gasoline, diesel, hydrogenation-derived renewable diesel (HDRD), alcohol, ammonia, biodiesels, hydrogen, natural gas, kerosene, syn-gas, propane, and a combination thereof. The particular mixture, ratio, or proportion of the two or more fuels relative to each other may depend at least in part upon a notch or other power setting of the powered vehicle 110. For example, the powered vehicle 110 may include throttle levels set as notches from 0-8. The notches may be adjusted by integer values in some examples (e.g., 0, 1, 2, 3, 4, and so on), or by finer adjustments in other embodiments. The ratio or proportion of fuel used may be determined based upon the selected notch. By way of example, in the illustrated example, only a first fuel may be used for notch settings of 3 and below. Increasing proportions of a second fuel, relative to the first fuel, may be used as the notch level increases from 4 and above. The fuel car 190 in the illustrate example is operatively connected to the powered vehicle via a fuel distribution path 191, and is configured to carry liquid natural gas (LNG) to be used by the powered vehicle 110. The LNG may be converted to compressed natural gas (CNG) for use by the powered vehicle 110. The powered vehicle 110 may also include a tank or other storage reservoir for carrying diesel fuel as the powered vehicle 110 traverses the route 102. Thus, the powered vehicle 110 is a multi-fuel powered vehicle configured to use a first fuel and a second fuel.

In one example, the multi-fuel powered vehicle may combust a primary fuel and a secondary fuel, wherein the primary fuel may be a liquid fuel and the secondary fuel may be a gaseous fuel. Additionally or alternatively, the primary fuel may be a higher carbon content fuel and the secondary fuel may be a lower carbon content or carbon free fuel. In one example, the primary fuel may be gasoline, diesel, HDRD, or the like. The secondary fuel may include one or more of hydrogen, natural gas, alcohol, ammonia, and the like.

The fuels may be stored separately on the powered vehicle 110, the fuel car 190, or a combination thereof. Each respective fuel may include a corresponding fuel tank, fuel lines, fuel pump, and fuel injectors. In this way, the fuels may only mix after being injected into or toward a cylinder of the engine. Additionally or alternatively, one or more of the fuel tanks may be configured to store two or more fuels.

The fuel car 190 is operably connected to the powered rail vehicle via the fuel distribution path 191. The fuel distribution path 191 may include one or more of piping, hosing, or other conduit configured for passage therethrough of fuel from the fuel car 190. The fuel distribution path 191 may also include valves, governors, fittings, or the like. In the illustrated example, the fuel car 190 provides fuel only to the powered vehicle 110. However, in various examples, more than one fuel car may supply the powered vehicle, and/or more than one powered vehicle may receive fuel from a given fuel car.

In one example, the fuel distribution path 191 may include a plurality of paths therein configured to direct a plurality of different fuels. Each of the plurality of paths may be sealed from other paths such that fuels do not mix as they flow from the fuel car 190 to the powered vehicle 110.

The fuel car 190 may include a plurality of storage compartments configured to store each of the plurality of different fuels. In one example, each of the plurality of storage compartments is sealed from other storage compartments such that the plurality of different fuels may not mix in the fuel car 190. Each of the plurality of storage compartments may be fluidly coupled to a correspond path of the plurality of paths. In this way, an injection amount of each fuel may be set independently.

The powered vehicle 110 depicted in FIG. 1 includes an energy management processing unit 120, a fuel car information unit 130, a display unit 140, an input unit 150, and a propulsion system 160. The energy management processing unit 120 may determine a trip plan or other specification of settings used to control the consist 104 to perform a mission. The fuel car information unit 130 is configured to obtain and/or process information from the fuel car 190 via an interface 192. The fuel car information unit 130 is configured to provide information for revising the trip plan to the energy management processing unit 120 based on information obtained from the fuel car 190, and to display information regarding the information obtained from the fuel car 190 via the display unit 140 to an operator or user of the powered vehicle 110.

The energy management processing unit 120 in the illustrated example is configured to determine or develop a trip plan specifying settings to be utilized by the consist 104 (e.g., the powered vehicle 110 and/or any other powered vehicles in the consist) during performance of a mission to achieve one or more desired results. The energy management processing unit 120 include a trip planning module 122 and a memory 124.

The energy management processing unit 120 (e.g., the trip planning module 122) may be configured to operate as a control system disposed on-board the powered vehicle 110. For example, the energy management processing unit 120 may receive one or more schedules from an off-board scheduling or dispatch system, and generate control signals that may be used to control propulsion of the consist 104 (e.g., the powered vehicle 110) over the route 102. For example, the powered vehicle 110 may include one or more wireless antennas (and associated transceiving equipment), such as RF or cellular antennas, that receive the schedules from the scheduling system. The energy management processing unit may examine the schedule, such as by determining the scheduled destination location and scheduled arrival time, and generate control signals based on the schedule.

The control signals may be used to automatically control tractive efforts and/or braking efforts of the consist 104 (e.g., the powered vehicle 110) such that the consist 104 (e.g., the powered vehicle 110) self-propels along the route 102 to the destination location. For example, the energy management processing unit 120 may be operatively coupled with a propulsion system 160 of the powered vehicle 110. The propulsion system 160 may include motors (such as traction motors), engines, brakes (such as air brakes and/or regenerative brakes), and the like, that generate tractive energy to propel the powered vehicle 110 and/or slow movement of the powered vehicle 110. The energy management processing unit 120 may generate control signals that automatically control the propulsion system 160, such as by automatically changing throttle settings and/or brake settings of the propulsion system 160. (As used herein, self-propulsion includes automatic operation under the purview of an operator, who may have the option to take over manual control of the vehicle.)

In another example aspect, the control signals may be used to prompt an operator of the powered vehicle 110 to manually control the tractive efforts and/or braking efforts of the powered vehicle 110. For example, the energy management processing unit 120 may include an output device, such as a computer monitor, touchscreen, acoustic speaker, or the like, that generates visual and/or audible instructions based on the control signals. In the depicted example, the display unit 140 may be employed as the output device. The instructions may direct the operator to manually change throttle settings and/or brake settings of the propulsion system 160.

The energy management processing unit 120 may form a trip plan for a trip of the consist 104 to travel to a scheduled destination location at a scheduled arrival time. The trip plan may include throttle settings, brake settings, designated speeds, or the like, of the powered vehicle 110 for various sections of the trip of the powered vehicle 110. For example, the trip plan can include one or more velocity curves that designate various speeds of the powered vehicle 110 along various sections of the route 102. The trip plan can be formed based on a trip profile associated with an upcoming trip of the consist 104. The trip profile can include information related to the consist 104, the route 102 over which the consist 104 will traverse during the upcoming trip, and/or other information. The information related to the consist 104 can include the type of powered vehicle 110, the tractive energy generated by the powered vehicle 110 (and any other powered vehicles) in the consist 104, the weight or mass of the powered vehicle 110, the fuel car 190, any other powered vehicles or fuel cars, and/or cargo being carried by the consist 104, the length and/or other size of the consist 104 (e.g., how many powered and non-powered units are mechanically coupled with each other in the consist 104), and the like. The information related to the route 102 can include the curvature, grade (e.g., inclination), existence of ongoing repairs, speed limits, and the like, for one or more sections of the route 102. The other information can include information regarding the cost of each type of fuel used by the consist 104, information related to conditions that impact how much fuel (e.g., how much of each type of fuel available for use) is used while traveling, such as the air pressure, temperature, humidity, and the like, information related to emission produced at the various throttle settings employed during a mission, and the like. The energy management processing unit 120 may form the control signals based on the trip plan. It may be noted that, while a single powered vehicle is shown in the example of FIG. 1, the energy management processing unit 120 may also be configured to control additional vehicles of a consist and/or provide a trip plan including settings for additional powered vehicles in a consist (e.g., when the powered vehicle 110 is utilized as a lead vehicle of a consist). The trip profile may be determined using a system such as the Trip Optimizer™ system of the General Electric Company, or other energy management system. For additional discussion regarding a trip profile, see U.S. patent application Ser. No. 12/955,710, Publication No. 2012/0136515, "Communication System for a Rail Vehicle Consist and Method for Communicating with a Rail Vehicle Consist," filed 29 Nov. 2010, the entire content of which is incorporated herein by reference.

In one example aspect, the trip plan is formed by the energy management processing unit 120 to reduce a total combined cost of plural fuel types that are consumed by the consist 104 as the consist 104 travels to the destination location associated with the received schedule. The energy management processing unit 120 may create a trip plan having throttle settings, brake settings, designated speeds, or the like, that reduces the total combined cost of the plural fuel types than if the consist 104 traveled to the scheduled destination location in another manner (e.g., in a manner configured to minimize amount of fuel consumed, to maximize speed or minimize travel time, or the like). As one example, the consist 104 may result in a lower total fuel cost in traveling to the destination location according to the trip plan than if the consist 104 traveled to the destination location while traveling at another predetermined speed, such as the maximum allowable speed of the route 102 (which may be referred to as "track speed'). The trip plan may result in the consist 104 arriving at the scheduled destination later than the scheduled arrival time. For example, following the trip plan may cause the consist 104 to arrive later than the scheduled arrival time, but within a predetermined range of time after the scheduled arrival time.

In the illustrated example, the trip planning module 122 is configured to determine a trip plan to optimize a total cost of combined fuel used (e.g., cost of a first fuel used added to cost of a second fuel used and so on). As used herein, to optimize a trip plan for a given parameter or objective may be understood to mean to determine a trip plan that maximizes (or minimizes) the parameter or objective, to select a trip plan that provides a relative maximum (or minimum) alternative from an available or predetermined group, or to determine or select a trip plan that prioritizes a given parameter or objective with respect to other parameter or objectives. Thus, for example, when minimizing for a given objective such as total combined fuel cost for plural fuels, a trip plan providing a total combined fuel cost that is lower than all other available or predetermined trip plans may be selected. As another example, when preferentially weighting, a trip plan having an absolute minimum total cost may not be selected if one or more other parameters may be improved a sufficient amount relative to a relatively small increase in total combined fuel cost. Thus, in some examples, total combined fuel cost may be optimized for, while still allowing for potential trade-offs in fuel cost that may provide substantial benefits regarding one or more additional goals or objectives, such as travel time, amount of emissions, or the like. Thus, when preferentially weighting for total combined fuel cost, an alternate performance measure (e.g., fuel efficiency or amount of fuel used, time to perform mission, or the like) may be lowered or worsened.

In some examples, additionally or alternatively, fuel availability may be included in the trip plan optimization. Fuel availability may include one or more of current fuel levels of the plurality of fuels, fuel stations comprising one or more of the plurality of fuels, wait times at fuel stations comprising one or more of the plurality of fuels, distances to fuel stations comprising one or more of the plurality of fuels, and prices at fuel stations comprising one or more of the plurality of fuels. In one example, if the fuel availability of one of the plurality of fuels is relatively low due to a current fuel level being low and a number of fuel stations comprising the fuel being low, then the trip plan optimization may include adjusting a fuel combustion ratio to consume less of the fuel. For example, if a current fuel combustion ratio includes a first fuel and a second fuel, and availability of the first fuel is relatively low, then the trip plan optimization may include adjusting the fuel combustion ratio to decrease usage of the first fuel and increase usage of the second fuel and/or introduce a third fuel. In one example, the third fuel may correspond to a fuel where the total combined fuel cost is still reduced relative to a fuel cost of consuming only a single fuel, an average cost based on other vehicles traveling the route, or the like. In one example, the reduction of the first fuel may be based on one or more of the fuel availability conditions. For example, if the price of the first fuel is relatively high (e.g., higher than an average price) at the fuel stations, then usage of the fuel may be further decreased compared the wait time being relatively high. Thus, in one example, the total combined fuel cost may still be reduced.

Additionally or alternatively, the fuel combustion ratio may be adjusted along different portions of the trip based on the fuel availability. For example, fuel prices, wait times, fuel levels, and so on may change along the trip such that a first fuel combustion ratio may include a lowest total combined fuel cost along a first section of the trip but not along a second section of the trip. As such, the fuel combustion ratio may be adjusted to a second fuel combustion ratio, wherein the second fuel combustion ratio may include additional fuels, fewer fuels, or different amounts of fuels included in the first fuel combustion ratio.

In the illustrated example, the trip planning module 122 is configured to obtain a first cost of a first fuel and a second cost of a second fuel. For example, the trip planning module 122 may obtain a cost (e.g., a cost on a volumetric basis such as price per gallon) of natural gas or other gaseous fuel such as ammonia, hydrogen, and the like, and also obtain a cost (e.g., price per gallon) of diesel fuel, alternatives thereof (e.g., HDRD, biodiesel, etc.), gasoline, and the like. The cost may be a current cost, or may be a projected cost corresponding to a future time of replacement of fuel expended during a mission (e.g., a trip). As used herein, "to obtain" may include "to receive." For example, prices of two or more fuels may be input by a user or operator via the input unit 150. As another example, the trip planning module 122 may have access to one or more off-board sources that list the costs of different fuels. As one more example, the trip planning module may periodically and/or automatically be provided updates to a current cost of fuel from an off-board source.

The trip planning module may receive updates from a central server in wireless communication with the trip planning module 122 along with other trip planning modules of different vehicles. The trip planning module may further share data with the central server with regard to vehicle location and fuel availability. In one example, the central server may analyze the data from the trip planning modules to determine an average fuel cost, an average wait time, locations of fuel stations comprising various fuels, and the like via a processor.

The depicted trip planning module 122 is also configured to determine a proportional ratio of the first fuel and the second fuel for each of plural power settings available for use during performance of the mission along the route 102. For example, differently proportioned mixes of the first and second fuels may be employed at different power settings (e.g., throttle settings such as notch settings). As indicated above, in some examples, only a first fuel, such as diesel fuel, may be used at a notch setting of 3 or lower. At notch settings higher than 3, however, progressively larger proportions of a second fuel may be used relative to the first fuel with increasing notch setting. Thus, by determining the time or distance set at each notch during a trip plan (e.g., a potential or proposed trip plan), the trip planning module may determine the amount of each type of fuel used during the execution of the trip plan, which may be used to determine the cost of each type of fuel as well as the total combined cost of both fuels.

Further, the trip planning module 122 of the illustrated example is configured to determine a trip plan specifying power settings for corresponding plural sections of the route to perform the mission using the first cost (e.g., cost of natural gas on a per-volume basis), the second cost (e.g., the cost of diesel on a per-volume basis), and the proportional ratio (e.g., the proportions of diesel and natural gas used at each notch setting) for each of the power settings to optimize a total combined cost of fuel used during the performance of the mission. Thus, the total combined cost of two different fuels (e.g., natural gas and diesel, or ammonia and HDRD, or hydrogen and diesel, and so) may be optimized (e.g., maintained at a minimum or preferentially weighted relative to other objectives such as amount of fuel used, time demanded to perform mission, or the like). The total fuel cost may be optimized by using one or more predetermined formula, table, or other relationship to develop a trip plan having a minimum or otherwise optimized total combined fuel cost, or may be optimized by selecting a particular trip plan from a finite group of trip plans which have been prepared to perform the mission. The total fuel cost may be optimized while maintaining one or more other objectives within a threshold value (e.g., maintaining a total time to perform mission under a maximum threshold time, maintaining emission levels for all or a portion of a mission under a maximum threshold, maintaining amount of one or both fuels under a maximum threshold amount, or the like).

In some examples of the present inventive subject matter, a group of trip plans may be analyzed using a model to provide a total combined cost of two or more fuels for each of the trip plans (and, optionally, results for other parameters or objectives such as time to perform mission, emission levels, or the like). Then, based on the total combined fuel cost (and, optionally taking other objectives into account), the trip planning module 122 may select the proposed trip plan that provides the lowest total fuel cost (or provides the lowest total fuel cost as a weighted preference with other objectives). For example, a trip plan that provides a large savings in total emission and/or time of performance of mission while still providing a relatively low total combined cost of fuel may be selected over a trip plan that provides a minimum total combined cost of fuel but also results in significantly larger amounts of emissions and/or a significantly longer amount of time to perform a mission. Significantly larger amounts of emissions may include an increase of 10% or more total emissions. Similarly, a significantly longer amount of time to perform the mission may include 10% of more time needed to perform the mission.

Thus, in some embodiments, the trip planning module 122 may perform a simulation for each a group of proposed or potential trip plans, or determine resulting combined fuel cost (along with other results) using a model, and select from the trip plans to identify the proposed trip plan that results in the lowest total combined fuel cost. In some embodiments, the trip plan may be constrained by one or more conditions not related to the total combined cost of fuel. For example, the potential trip plans may be evaluated meet one or more threshold values, such as a maximum time to perform a mission. As another example, the trip plan may be constrained to use only a given maximum amount of one or both fuels (e.g., an amount of natural gas corresponding to the amount of gas carried in the fuel cars of a consist). In various embodiments, the proposed trip plan selected from the group may not provide an absolute minimum total combined fuel cost, but may allow for trade-offs regarding other objectives. For example, a relatively large improvement in another objective may be used to outweigh a relatively small worsening of total combined fuel cost. The total combined fuel cost may be one of a number of weighted factors use to select the trip plan from the group of potential trip plans, with the total combined fuel cost receiving a preferential weighting. The selection may be performed autonomously, or, alternatively, may be performed with operator involvement or feedback (e.g., a number of trip plans may be displayed to the operator, with a resulting total combined fuel cost along with one or more other resulting values, such as time to perform mission, emissions levels, or the like, with the operator allowed to select from among the displayed group).

To achieve improved or optimized total combined fuel costs, the trip plan determined or selected by the trip planning module 122 may vary different factors or settings in ways that generally would not be selected to achieve other objectives or goals. For example, the energy management processing unit 120 (e.g., the trip planning module 122 of the energy management processing unit 120) may be configured to select or determine a trip plan to preferentially weight the use of a first type of powered vehicle (e.g., a multi-fuel vehicle) over use of a second type of powered vehicle (e.g., a vehicle limited to use of a single fuel such as diesel fuel).

For example, the consist 104 may include a first group of vehicles configured to use at least the first fuel and the second fuel (e.g., natural gas and diesel), and a second group of vehicles configured to use only one of the first fuel or second fuel (e.g., only diesel). The energy management processing unit 120 (e.g., the trip planning module of the energy management processing unit 120) may be configured to select between use of the first and second groups to preferentially weight use of one of the first group or the second group based on a difference between the first cost of the first fuel and the second cost of the second fuel. For example, when the cost of a first fuel is relatively low, the trip planning module 122 may preferentially weight the use of a group of vehicles configured for consumption of higher amounts of the first fuel. When the cost of a second fuel is relatively low, the trip planning module may preferentially weight the use of a group of vehicles configured for consumption of higher amounts of the second fuel. In some examples, emissions target may be maintained by balancing use of vehicles configured to consume higher amounts of lower cost fuels with vehicles configured to consume other fuels that either offset or do not contribute to similar emission byproducts of the lower cost fuels.

Figure 2:
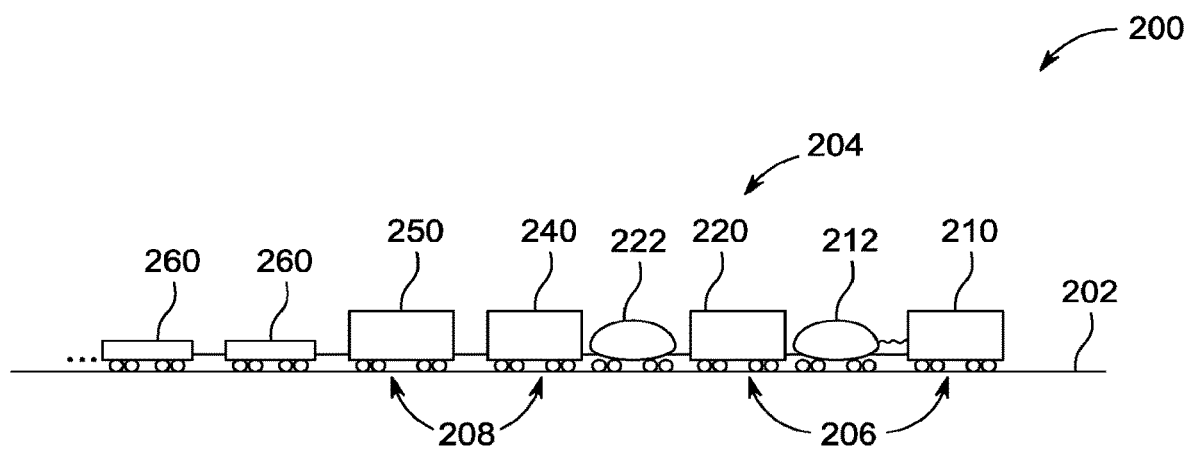
FIG. 2 is a schematic diagram of a transportation system, according to an embodiment of the disclosure.

FIG. 2 provides a schematic view of a transportation system 200 including a consist 204 traversing a route 202. The consist 24 includes a first powered vehicle 210, a first fuel car 212, a second powered vehicle 220, a second fuel car 222, a third powered vehicle 240, a fourth powered vehicle 250, and cargo units 260. The illustrated arrangement is provided by way of example and not limitation, as other types, numbers, orientations, and/or positions of individual units of the consist 204 may be employed in various embodiments.

The first powered vehicle 210 and the second powered vehicle 220 are configured as multi-fuel powered vehicles configured to run on at least a mixture of two or more of gasoline, diesel, hydrogenation-derived renewable diesel (HDRD), alcohol, ammonia, biodiesels, hydrogen, natural gas, kerosene, syn-gas, and propane. The first powered vehicle 210 is operably connected to and receives a second fuel from the first fuel car 212, and the second powered vehicle 220 is operably connected to and receives a second fuel from the second fuel car 222. The third powered car 240 and the fourth powered car 250 are not configured as multi-fuel vehicles, and are configured to only use a first fuel for combustion. In one example, the first fuel is a higher carbon content fuel and the second fuel is a lower carbon content fuel. It may be noted that one of the powered vehicles may be configured as a lead vehicle and may provide control instructions to the other powered vehicles (it may further be noted that the lead powered unit need not necessarily be disposed at a leading end of the consist). A processing unit on-board one of the powered vehicles (e.g., the lead vehicle) may also determine and/or modify a trip plan for all of the powered vehicles.

The first powered vehicle 210 and the second powered vehicle 220 thus form a first group 204 of multi-fuel vehicles, and the third powered vehicle 240 and the fourth powered vehicle form a second group 208 of single-fuel vehicles. Depending upon the cost differential of the first and second fuels, one of the groups may provide a relatively lower overall combined fuel cost to operate. Thus, a distribution of tractive efforts between the first group 206 and the second group 208 may be altered to improve or minimize total combined fuel cost depending on the cost differential between natural gas and diesel. For example, when the cost of natural gas is relatively low, the trip planning module 122 may select a trip plan that increases the use of the first group of vehicles 206 relative to the second group of vehicles 208 to optimize total combined fuel cost. Conversely, the trip planning module 122 may select a trip plan that increases the use of the second group of vehicles 208 relative to the first group of vehicles 206 to optimize total combined fuel cost when the cost of diesel is relatively low compared to the cost of natural gas. Thus, the trip planning module 222 may preferentially weight the use of one of the groups of vehicles, resulting in different power settings for the vehicles of the different groups than would be determined for a trip plan that did not optimize or address total combined fuel cost (e.g., a trip plan configured to account for total fuel used or efficiency, price of a single type of fuel, or the like).

In some examples of the present inventive subject matter, the energy management processing unit 120 (e.g., the trip planning module 122 of the energy management processing unit 120) may be configured to select between at least two power settings to preferentially weight use of at least one setting based on a difference between the cost of the first fuel (e.g., the cost of natural gas) and the cost of the second fuel (e.g., diesel fuel).

In some examples of the embodiment of FIG. 2, the first group of vehicles 206 and the second group of vehicles 208 may both include multi-fuel vehicles. In one example, the first group of vehicles 206 may be configured to combust HDRD and ammonia and the second group of vehicles may be configured to combust diesel and hydrogen. Additionally or alternatively, the first and second groups of vehicles may be configured to combust a greater range of fuels. For example, the first group of vehicles 206 and the second group of vehicles 208 may be configured to combust a ratio of any of diesel, biodiesel, HDRD, ammonia, hydrogen, natural gas, gasoline, alcohol, and the like. Operation of one of the first or second groups of vehicles may be adjusted in response to emissions targets. For example, if both groups belong to a vehicle fleet, then operation of a subset of vehicles of one of the groups may be adjusted to a more expensive total fuel combustion ratio relative to the other vehicles. However, by adjusting the fuel combustion ratio to the more expensive total fuel combustion ratio, a total fuel cost for all the vehicles of the first and second groups may be less than if the fuel combustion ratio of all the vehicles was adjusted. By doing this, an emission target may be met while maintaining fuel costs for a vehicle fleet relatively low. That is to say, rather than slightly adjusting the fuel combustion ratio of all the vehicles, the fuel combustion ratio of some of the vehicle may be adjusted more acutely while the fuel combustion ratio of the remaining vehicles may be maintained. By doing this, fuel costs may remain lower in a larger number of vehicles while emissions targets may still be met. The fuel selected to adjust the fuel combustion ratio to meet emissions target may be based on fuel availability and emission type.

Figure 3:
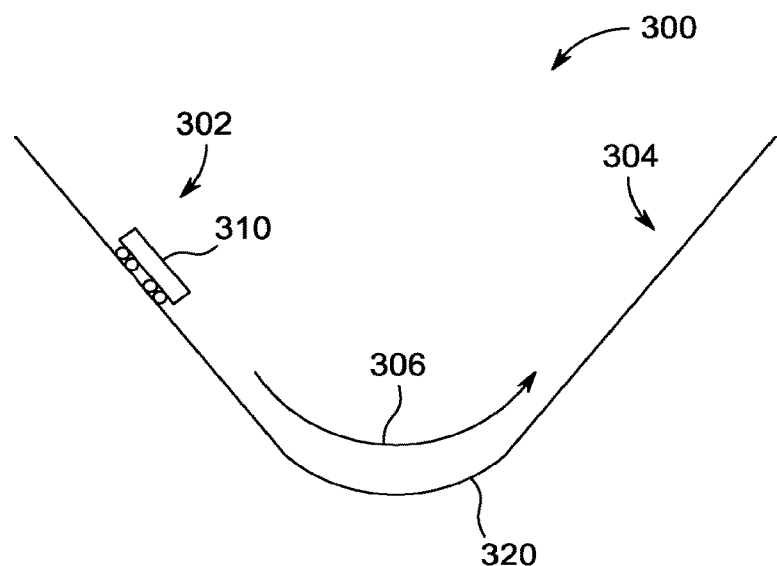
FIG. 3 depicts an example scenario of a vehicle traversing a route, according to an embodiment of the disclosure.

FIG. 3 provides an example of a selection between at least two power settings to preferentially weight use of at least one power setting based on a fuel cost differential between the first and second fuels (e.g., diesel and natural gas). In the example scenario 300 depicted in FIG. 3, a vehicle 310 traverses a route 320 in a direction of travel 306. The route 320 includes a first portion 302 having a negative grade or slope along the direction of travel 306, and a second portion 304 having a positive grade or slope along the direction of travel 306. Thus, the vehicle 310 is heading downhill while traversing the first portion 302 and uphill while traversing the second portion 304. The vehicle 310 is configured to use only diesel fuel at notch 3 or below, and a progressively higher proportion of natural gas at higher notch settings.

Conventionally, one or more notch settings may be selected for the downhill portion to achieve a maximum speed (e.g., reach a speed limit allowed for the route 320) at the bottom of the first portion 302 to provide momentum heading into the second portion 304, thereby reducing the effort, and fuel expended, to climb the grade of the second portion 304.

However, if the cost differential between natural gas and diesel is high enough (e.g., the cost of natural gas is significantly lower than the cost of diesel), the total combined cost for traversing the first portion 302 and the second portion 304 may be reduced by using a higher notch level to climb the second portion 304. The higher notch for the uphill part of the mission and lower notch for the downhill part of the mission may result in reduced fuel efficiency due to the inability to take full advantage of gravity, but may result in an overall lower cost of fuel if the cost of natural gas is sufficiently lower than the cost of diesel.

For example, in the example scenario 300 of FIG. 3, use of a notch setting of 3 in the first portion 302 may result in the speed limit being reached at the junction of the first portion 302 and the second portion 304, and demand only the use of a notch setting of 3 to maintain a desired speed on the second portion 304. However, the resulting notch settings of 3 only use diesel, which may result in a relatively high total cost if the cost differential between diesel and natural gas is sufficiently high. Thus, in the illustrated embodiment, a notch setting of 2 (or lower) may be used for the first portion 302. Because the vehicle 310 is thus traveling below the speed limit when completing the first portion 302 and starting the second portion 304, a higher notch level may be used to maintain the desired speed up the second portion 304 when compared to the example where the speed limit was reached during the second portion 302. For example, a notch setting of 4 or 5 may be utilized to maintain the vehicle 310 at a desired speed over the second portion 304 when a notch setting of 2 or lower was used over the first portion 302. Thus, efficiency will be lowered and/or a total amount of fuel may be used. However, because the higher notch used to climb the second portion 304 will use natural gas (or a relatively higher proportion of natural gas) than a lower notch, overall total combined fuel cost will be reduced if the cost differential between natural gas and diesel is large enough. Accordingly, in various embodiments, the trip planning module may determine or select a trip plan having higher notch settings for one or more portions of the route than would have been selected to meet other objectives, such as overall efficiency or overall fuel used. Conversely, when the cost of diesel is relatively low compared to natural gas, the trip planning module 122 may preferentially lower notch settings that result in a higher proportion of diesel fuel used relative to natural gas.

For example, the trip planning module 122 may be configured to formulate a trip plan giving preference to higher notches when the cost differential between natural gas and diesel is relatively large. As another example, the trip planning module 122 may be configured to formulate a group of potential trip plans at least some of which have portions with higher notch settings than would be used to achieve other objectives, and to select a trip plan from among the group based on the resulting total combined fuel cost (optionally, with consideration to other resulting objectives). As yet one more example, the trip planning module 122 may be configured to start with an archived trip plan over a similar route and make adjustments to increase notch at one or more portions to take advantage of a relatively high fuel cost differential. As a further example, the trip planning module 122 may obtain a trip plan previously determined to optimize or satisfy one or more different objectives (e.g., minimum time to perform mission) and adjust the obtained trip plan to provide improved total combined fuel cost (e.g., by preferentially increasing use of multi-fuel vehicles and/or higher notch settings when the cost differential between natural gas and diesel fuel is relatively high).

In various embodiments, the trip planning module 122 may use considerations such as type of vehicle (e.g., multi-\fuel, single fuel), mixture of fuels at various notch levels (e.g., higher proportion of natural gas at higher settings), or the like to create variations in proposed or potential trip plans. Thus, for a group of potential trip plans prepared or identified by the trip planning module 122, at least some of the plans may be designed to use increased notch levels and/or increased use of one type of vehicle relative to a trip plan configured to meet other objectives. For example, the trip planning module 122 may obtain an archived trip plan for a similar consist traversing a similar route, and provide a number of proposed trip plans that each differently modify the archived trip plan to variously increase notch settings and/or use of a given type of vehicle, among other considerations. Then, using a model, the resulting total combined fuel cost (optionally, along with other results such as emission levels, amount of fuel used, time to perform mission, or the like) may be determined for each potential trip plan, and a trip plan selected from the potential trip plans.

In some examples, if multi-fuel combustion is promoted at increased notch levels, then an example method may include intrusively increasing the notch level (e.g., engine load) to combust a greater variety of fuels if combusting the greater variety of fuels is less expensive than combusting fewer fuels. The excess power generated from the increased notch level may be used to recharge an energy storage device, such as a battery, fed back to a grid from which other vehicles may receive power, or the like. In this way, the multi-fuel vehicle may additionally be a hybrid vehicle.

As seen in FIG. 1, the depicted fuel car information unit 130 is operably connected to the fuel car 190 via the interface 192. The interface 192 is configured to communicably couple the fuel car information unit 130 and the fuel car 190. Information may be exchanged between the fuel car information unit 130 and the fuel car 190 via the interface 192. The interface 192 may include one or more cables or may be configured to convey Ethernet-compatible messages between the fuel car information unit 130 and the fuel car 190. Alternatively or additionally, the interface 192 may be configured to send digital signals (e.g., signal at a high or low voltage state corresponding to one or more states, settings, or conditions of a vehicle) similar to a multiple unit (MU) line. In some embodiments, the interface 192 may provide for wireless communication between the fuel car information unit 130 and the fuel car 190.

The fuel car information unit 130 in the illustrated example is disposed on-board the powered vehicle 110. Alternatively or additionally, one or more aspects of the fuel car information unit 130 may be disposed off-board the powered vehicle 110, and may be communicably coupled with the powered vehicle 110 and the fuel car 190, for example, wirelessly. The fuel car information unit 130 is generally configured to obtain fuel car information from the fuel car 190. The fuel car information unit 130 may obtain the fuel car information by, for example, receiving raw information from the fuel car 190 and/or processing raw information to obtain modified information. The fuel car information unit 130 is also operably coupled to the display unit 140, and is configured to provide the fuel car information to the display unit 140, which displays at least a portion of the fuel car information. As used herein, raw information may be understood as information received from a source that is in substantially the same state or form as when received from the source, or information that has been received but not processed.

The depicted fuel car information unit 130 includes a communication unit 132, an analysis unit 134, and a memory 138. The communication unit 132 is configured to one or more of prepare messages for transmission to the fuel car 190 via the interface 192, transmit messages to the fuel car 190, receive messages from the fuel car 190, and/or process received information (e.g., translate a message from a first format utilized by the fuel car 190 to a second format utilized by the powered vehicle 110). Generally, the analysis unit 134 is configured to provide additional processing and/or to prepare information for transmission to the display unit 140.

The depicted communication unit 132 is configured to receive messages from the fuel car 190 and to prepare and/or transmit messages to the fuel car 190. For example, the communication unit 132 may be configured to provide powered vehicle information to the fuel car 190. The powered vehicle information may include information about one or more operational states of the powered vehicle 110. Additionally or alternatively, the powered vehicle information may include information for communicating with the powered vehicle 110, such as information describing a format or protocol for communication with the powered vehicle 110. In some examples, the powered vehicle information includes a software download, such as downloadable software for configuring the fuel car 190 for communication with the fuel car information unit 130. For example, the fuel car 190 may be an older or legacy vehicle using a different format or software, and the communication unit 132 may provide newer software, such as an update, to the fuel car 190.

One or more types of fuel car information may be received from the fuel car 190 by the fuel car information unit 130. For example, alarm information corresponding to a fault of the fuel car 190 may be received. In various embodiments, the fuel car 190 may include one or more sensors configured to detect and/or determine a fault with the fuel car 190 (e.g., a broken valve, a leak, a low fuel level, an excessive, dangerous, or otherwise undesirable temperature or pressure), and the fuel car 190 may provide the alarm information to the fuel car information unit 130. The alarm information may be configured as an alarm that merely alerts an operator or user of the powered vehicle 110 to an alarm condition (e.g., via the display unit 140), and/or may include a message or information providing specific information regarding the cause or type of alarm. For example, the alarm information may identify the pressure or temperature resulting in the alarm, identify a broken valve on the fuel car 190, identify a leak of the fuel car 190, or the like.

Alternatively or additionally, as another example, the fuel car information provided to the fuel car information unit 130 may include operational information corresponding to an operational state of the fuel car 190. The operational information, for example, may include one or more of a pressure of the fuel car 190, a temperature of the fuel car 190, an amount of fuel in the fuel car 190 or fuel level, a rate at which fuel is being dispensed from the fuel car 190, or the like. For purposes of clarity and avoidance of doubt, the information provided between the vehicles herein does not include messaging strictly related to conventional fueling requests by the powered vehicle 110 or the conventional providing of fuel by the fuel car 190, such as a request for fueling or to stop fueling, or a message confirming that fuel is being provided.

Alternatively or additionally, as one more example, the fuel car information provided to the fuel car information unit 130 may include statistical information corresponding to historic use of the fuel car 190. For example, statistical information may include one or more of a number of times the fuel car 190 has been re-filled, an elapsed time since the last re-fill of the fuel car 190, miles in use of the fuel car 190 (and/or miles in use since the last service or maintenance), the number of times of opening or closing a given valve, or the like. The statistical information may be used by the fuel car information unit 130, for example in conjunction with performing diagnostic or troubleshooting operations, in conjunction with scheduling maintenance activities, or the like.

Thus, examples of the inventive subject matter may provide different functionality than that provided by conventional systems which do not provide for communication between a fuel car and a powered vehicle as disclosed herein. For example, an improved level of information is provided. For example, if a fuel car has a fault preventing delivery of fuel, with conventional systems, the powered vehicle may detect that fuel is being provided but may have no information corresponding to the cause of fuel not being provided. Examples of the present inventive subject matter provide for communication of information regarding the cause of fuel not being delivered (e.g., information describing a fault such as a broken valve). Based on information received from the fuel car 190 and/or conclusions reached based on the received information, the fuel car information unit 190 may identify causes of issues with fueling from the fuel car, can plan appropriately for maintenance activity (e.g., provide a message to an upcoming stop regarding a part needed or a maintenance activity to be performed so that the part and/or crew may be ready when the powered vehicle 110 arrives at the stop), and/or provide information regarding the fuel car to the trip planning module 122 to re-plan a trip plan to account for an operational state or other condition of the fuel car 190.

It may be noted that the fuel car information may be processed by the fuel car information unit 130 after receipt. For example, the communication unit 132 may translate or re-configure a message received from the fuel car 190 into a format for more convenient use by the fuel car information unit 130 of the powered vehicle 110.

Additionally or alternatively, the analysis unit 134 may perform one or more processing operations on received fuel car information to obtain additional or alternative fuel car information (e.g., modified fuel car information). For example, the analysis unit 134 may use one or types of operational information (e.g., pressure, temperature, or the like) to determine or calculate a value or parameter not included in the raw fuel car information received by the fuel car information unit 130.

As another example, the analysis unit 134 may combine or compare information received from the fuel car 190 with information obtained (e.g., sensed or detected via one or more sensors disposed on-board the powered vehicle 110) from the powered vehicle 110. As one illustrative example, the fuel car information unit 130 may receive fuel car information corresponding to an amount or rate of fuel being delivered as determined by the fuel car 190 (e.g., by one or more processing units disposed on-board the fuel car 190). Further, the fuel car information unit 130 may receive powered vehicle information corresponding to an amount or rate of fuel being received by the powered vehicle 110. The analysis unit 134 may then compare the amount of fuel being delivered by the fuel car 190 with the amount of fuel being received by the powered vehicle 110. If the amounts do not match sufficiently closely, the analysis unit 134 may determine that a fault or issue exists with fuel delivery and deliver an appropriate alarm, for example to alert an operator and/or the trip planning module 122, may cause a shut-off of fuel delivery from the fuel car 190 to the powered vehicle 110, may display a message via the display unit 140 to an operator identifying the issue or fault, or the like. The comparison of information from the fuel car 190 with information from the powered vehicle 110 may be performed responsive to a request from an operator and/or autonomously (e.g., periodically during the performance of a mission to monitor performance of the fuel car 190 and/or responsive to a detected condition or event during performance of the mission).

In various examples of the present inventive subject matter, the fuel car information unit 130 is configured to initiate a self-test of the fuel car 190, for example to send a message commanding or instructing the fuel car 190 to perform a self-test. For example, an operator may provide an input via the input unit 160 requesting a self-test, or the self-test may be initiated autonomously by the fuel car information unit 130 (e.g., periodically and/or as part of a protocol such as a start-up protocol.) Thus, in contrast to conventional systems which demand an operator to leave a powered vehicle and perform any diagnostic activities including initiating a self-test on or at a fuel car, various examples of the present inventive subject matter provide for remote diagnostic capabilities (e.g., diagnostic operations of the fuel car 190 initiated by, performed by, and/or displayed at the powered vehicle 110), increasing safety and convenience by allowing an operator to stay in a cab of the powered vehicle 110. Further, in some embodiments, diagnostic examinations of the fuel car 190 may thus be performed while the consist 104 is in motion.

Figure 4:
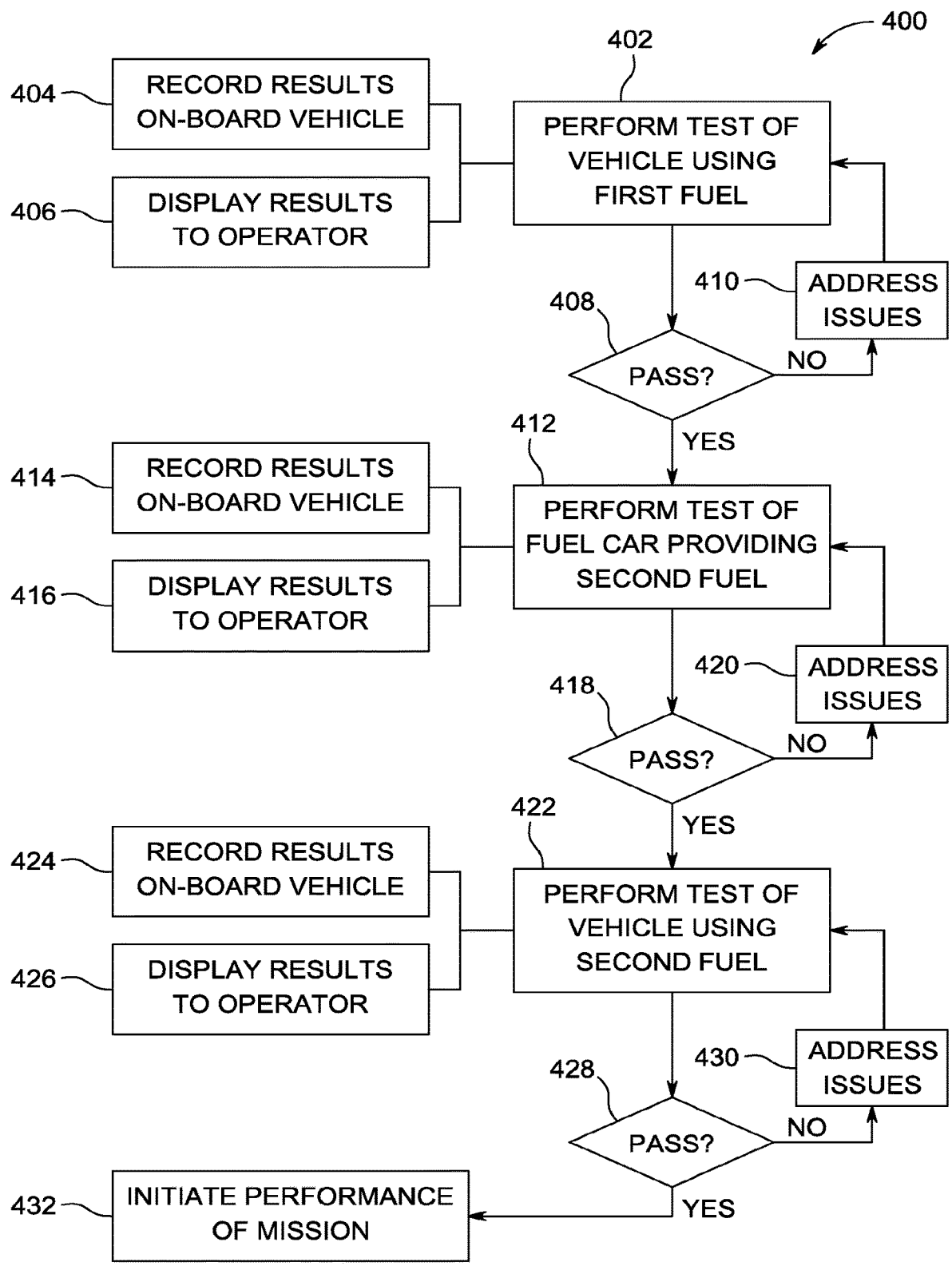
FIG. 4 illustrates a flowchart of a method for testing vehicles of a consist, according to an embodiment of the disclosure.

FIG. 4 illustrates a flowchart of a method 400 for performing a test (e.g., including a self-test) of one or more vehicles in a consist in accordance with one example of the present inventive subject matter. The method may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion. In various embodiments, portions, aspects, and/or variations of the method may be able to be used as one or more algorithms to direct hardware to perform operations described herein. Instructions for the method 400 may be stored in memory of a processor of the vehicle. When the instructions are executed, the processor may execute the method 400 and the rest of the methods included herein.

At 402, a test is performed of a vehicle using a first fuel. The vehicle, for example, may be a multi-fuel vehicle configured to use a first fuel stored in a tank on-board the vehicle and a second fuel stored in a fuel car or fuel tender. For example, in the example discussed in connection with FIG. 4, the first fuel may be diesel fuel and the second fuel may be natural gas. Additionally or alternatively, the first fuel and the second fuel may be selected from one or more of gasoline, diesel, hydrogenation-derived renewable diesel (HDRD), alcohol, ammonia, biodiesels, hydrogen, natural gas, kerosene, syn-gas, propane. Additionally or alternatively, a third fuel, a fourth fuel, and so on may be included in the fuel car. The test of the vehicle using the first fuel may be a self-test (e.g., a series of diagnostics run by the vehicle itself) and/or may include monitoring by an operator. The test may include starting the engine of the vehicle, running the engine of the vehicle using the first fuel (e.g., diesel from a tank or reservoir disposed on-board the vehicle), and monitoring the performance of the vehicle during the running of the vehicle with the first fuel. It may be noted that the tests performed as part of the example depicted in FIG. 4 may be performed while the vehicle is stationary before performance of a mission.

In some examples of the present inventive subject matter, results of the test performed at 402 may be recorded and/or displayed to an operator. For example, at 404, the results of the test of the vehicle using the first fuel may be recorded on-board the vehicle (e.g., recorded with memory 124). Further, the results of the test may be displayed to an operator of the vehicle at 406 (e.g., via display unit 160). The results displayed may be limited to an indication that the test was passed or not passed, or may include additional information (e.g., an identification of one or more reasons or degradation responsible for a test not being passed, an identification of one or more passing values, a displayed checklist identifying each portion of a series of tests passed and/or not passed, or the like).

If it is determined at 408 that the test of the vehicle using the first fuel is passed (e.g., the vehicle performs or operates within approved parameters, no issues demanding attention are identified, or the like), the method may proceed to 412. If it is determined that the test was not passed at 408, then one or more issues may be identified and/or addressed at 410, and the test may be repeated after the issues are addressed.

At 412, a test of the fuel car may be performed. The fuel car may be tested before any of the second fuel is provided to the vehicle, with fuel only provided from the fuel car if the test is successfully passed. The test of the fuel car at 408 may be a self-test performed by the fuel car responsive to a self-test initiation request or command provided by the powered vehicle to the fuel car. For example, an operator positioned within the fuel car may enter a request for a self-test of the fuel car using an input disposed within the fuel car. Thus, the test of the fuel car may be performed remotely from the powered vehicle without the operator of the powered vehicle needing to leave the powered vehicle to perform or initiate the test of the fuel car.

In some examples of the present inventive subject matter, results of the test performed at 412 may be recorded and/or displayed to an operator of a vehicle (e.g., a powered vehicle from which the self-test of the fuel car was initiated). For example, at 414, the results of the test of the fuel car may be recorded on-board the vehicle (e.g., recorded with memory 138 of fuel car information unit 130). Further, the results of the test may be displayed to an operator of the vehicle at 416 (e.g., via display unit 160). The results displayed may be limited to an indication that the test was passed or not passed, or may include additional information (e.g., an identification of one or more reasons or faults responsible for a test not being passed, an identification of one or more passing values, a displayed checklist identifying each portion of a series of tests passed and/or not passed, or the like).

If it is determined, at 418, that the test of the fuel car is passed (e.g., the fuel car performs or operates within approved parameters, no issues demanding attention are identified, or the like), the method may proceed to 422. If the test is not passed, then one or more issues may be identified and/or addressed at 420, and the test may be repeated after the issues are addressed.

With the fuel car having passed the test (e.g., self-test), fuel (e.g., the second fuel or natural gas in the example depicted in FIG. 4) may be provided from the fuel car to the powered vehicle. At 422, a test is performed of a vehicle using the second fuel. The test of the vehicle using the second fuel may be a self-test (e.g., a series of diagnostics run by the vehicle itself) and/or may include monitoring by an operator. The test may include starting the engine of the vehicle, running the engine of the vehicle using the second fuel (e.g., natural gas from the fuel car), and monitoring the performance of the vehicle during the running of the vehicle with the second fuel.

In some examples of the present inventive subject matter, results of the test performed at 422 may be recorded and/or displayed to an operator. For example, at 424, the results of the test of the vehicle using the second fuel may be recorded on-board the vehicle (e.g., recorded with memory 124). Further, the results of the test may be displayed to an operator of the vehicle at 426 (e.g., via display unit 160). The results displayed may be limited to an indication that the test was passed or not passed, or may include additional information (e.g., an identification of one or more reasons or degradation responsible for a test not being passed, an identification of one or more passing values, a displayed checklist identifying each portion of a series of tests passed and/or not passed, or the like).

If it is determined, at 428, that the test of the vehicle using the second fuel is passed (e.g., the vehicle performs or operates within approved parameters, no issues demanding attention are identified, or the like), the method may proceed to 432. If the test is not passed, then one or more issues may be identified and/or addressed at 430, and the test may be repeated after the issues are addressed.

At 432, with the tests (e.g., test of a powered vehicle using a first fuel, test of a fuel car providing a second fuel, test of the powered vehicle using the second fuel provided by the fuel car) successfully passed, the mission may be initiated (e.g., the vehicle operated to traverse a route in accordance with mission objectives). It may be noted that certain additional self-tests of one or more aspects of either the vehicle or the fuel car may be performed during performance of the mission, as the operator may not be demanded to leave the powered vehicle during performance of self-tests of either the vehicle or the fuel car. It may be further noted that while the example of FIG. 4 is discussed in connection with a single powered vehicle and a single fuel car, certain general principles of the example of FIG. 4 may be applied to a consist having multiple powered vehicles and/or multiple fuel cars.

Returning to FIG. 1, it may be noted that the energy management processing unit 120 and the fuel car information unit 130 are operably connected. Thus, the energy management processing unit 120, which may include the processor configured to execute the method 400, may modify or adjust a trip plan during performance of a mission based on fuel car information received and/or processed by the fuel car information unit 130. In one example, the energy management processing unit 120 may be interchangeably referred to as the energy management processor 120. For example, if an alarm indicating an issue with a particular fuel car is provided or obtained by the fuel car information unit 130, the energy management processing unit 120 may re-plan the trip plan to eliminate usage of fuel provided by the particular fuel car. As another example, if a temperature or pressure of a given fuel car is at an undesirable level, the energy management processing unit 120 may provide a modified trip plan that stops use of fuel from the fuel car or adjusts (either increase or decrease as appropriate) the use of fuel from the fuel car. Other information that may be used during the course of a mission to re-plan a trip plan include an unexpectedly low fuel volume in one or more fuel cars, an unexpectedly high fuel volume in one or more fuel cars, a determined or detected fault of one or more fuel cars, a change in the cost of one or more types of fuels, or the like.

The depicted display unit 140 is configured to receive information from the fuel car information unit 130 and/or other portion or aspect of the powered vehicle 110 and to provide a display to a user. The display unit 140 of the illustrated embodiment is operably connected to the fuel car information unit 130 and the energy management processing unit 120 and is configured to display information from both. The display unit 140 may also be configured to display information received from one or more sensor or detectors (not shown) disposed on-board the powered vehicle 110 and/or one or more additional systems or subsystems, such as the propulsion system 160. The display provided to the user may be, for example, one or more of a visual display on one or more screens (e.g., textual message), visual display via an alert device (e.g., a flashing light, colored light, and/or light associated with a label or otherwise positioned to convey a particular message to an operator via activation of the lights) such as lights, or an audible display such as audible alarm and/or recorded or voice generated message played via a speaker. The display unit 140 may be configured to provide a combined display for both information describing or corresponding to the powered vehicle 110 and information describing or corresponding to the fuel car 190. The display unit 140 may include a printer configured to provide a hard copy of information (e.g., fuel car information and/or powered vehicle information).

Figure 5:
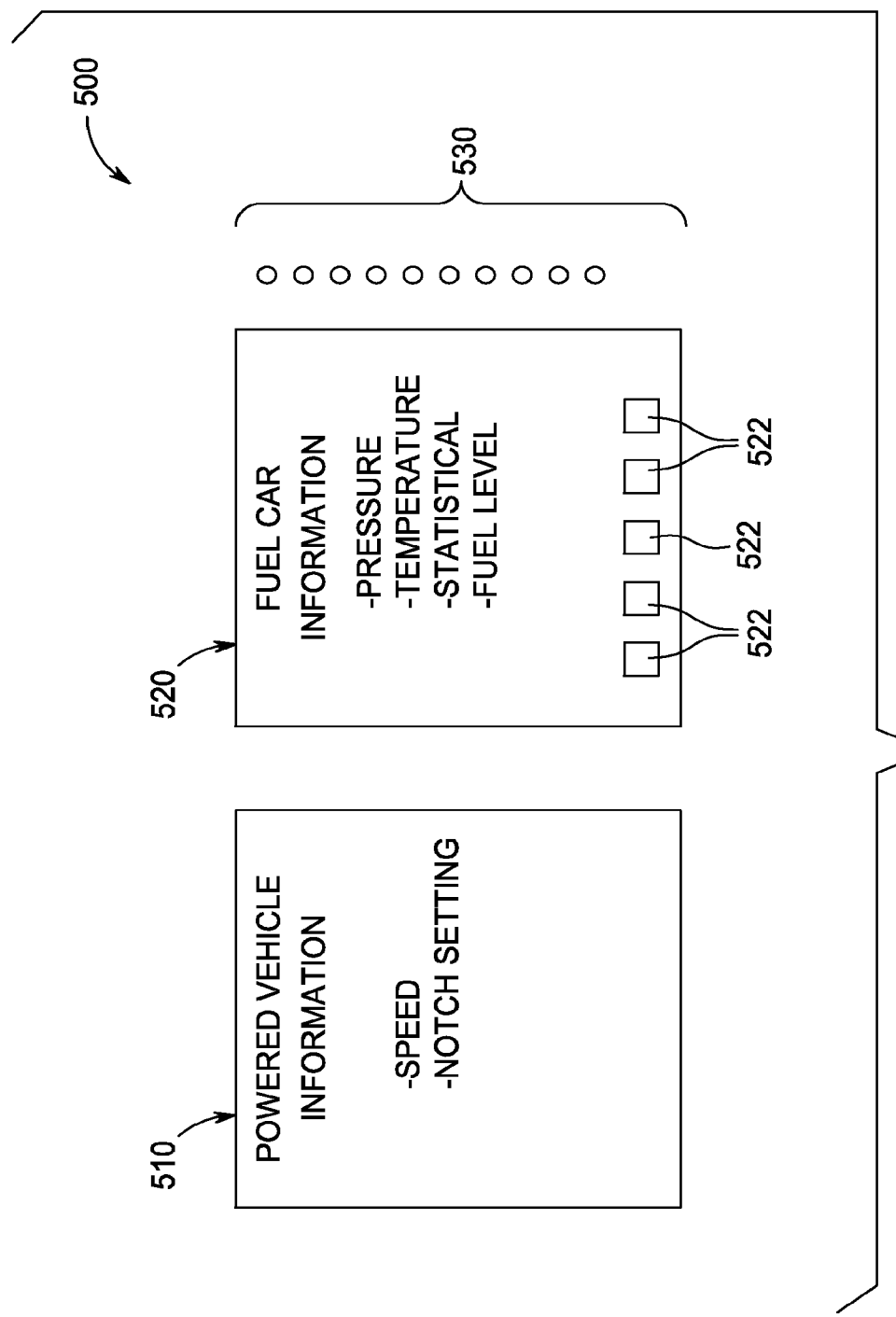
FIG. 5 is an example view of a display formed in accordance with an embodiment of the disclosure.

FIG. 5 illustrates an example display unit 500. The display unit 500 includes a first display 510 for displaying powered vehicle operation, a second display 520 for displaying fuel car information, smart buttons 522 for toggling between screens shown on a display (e.g., the second display 520), and alerts 530 (e.g., lights) for providing alarms or other alerts corresponding to information obtained, for example, directly from the fuel car 190 and/or determined by the powered vehicle (e.g., the analysis unit 134 of the fuel car information unit 130) at least partially based upon information received from the fuel car 190.

For example, the first display 510 may display vehicle or consist speed, throttle levels, or the like describing current operation and/or anticipated future operation. The second display 520 may display information, such as fuel car information and/or powered vehicle information and/or consist information, on one or more screens that an operator may toggle through. For example, the second display 520 in the illustrated example displays fuel car information including pressure, temperature, fuel level, and statistical information. An operator may toggle to a different screen, e.g., by depressing a smart button 522, by touching a portion of touchscreen, by entering a request via a keyboard or keypad, or the like. For example, a different screen may provide guidance for performing a self-test (e.g., a self-test of the powered vehicle 110 and/or the fuel car 190) and/or information regarding a self-test (e.g., confirming a successful satisfaction of the self-test or indicating problem. The alerts 530 may be individually configured to provide a light or other signal corresponding to a particular alert when the alert 530 is activated. For example, one light may be positioned to signify a low fuel level in a fuel car when the light is on, another light may correspond to an excessive or otherwise undesirable temperature of the fuel car, another light may correspond to a degradation (e.g., leak) in fuel delivery, fuel quality decreasing below a threshold quality, and so on. In some example, a message may be displayed, for example on the second display 520 providing further information (e.g., via a textual message displayed on the second display 520) regarding an activated alert 530. It may be noted that the example of FIG. 5 is provided for illustrative purposes, and that other numbers and/or types of displays used in various embodiments.

The input unit 150 is configured to receive a user input. The input unit 150 is operably connected to the display 140, the fuel car information unit 130, and the energy management processing unit 120 in the illustrated example. The input unit 150 may be used by an operator to request and/or perform a self-test of the powered vehicle 110 and/or the fuel car 190, to request information and/or request display of information regarding the fuel car 190 and/or the powered vehicle 110, request processing of a given type of information, or the like. The input unit 150 may include, for example, a keyboard, keypad, mouse, stylus, or the like. Further, all or a portion of the input unit 140 may be incorporated with the display unit 140, for example as part of a touchscreen.

Figure 6:
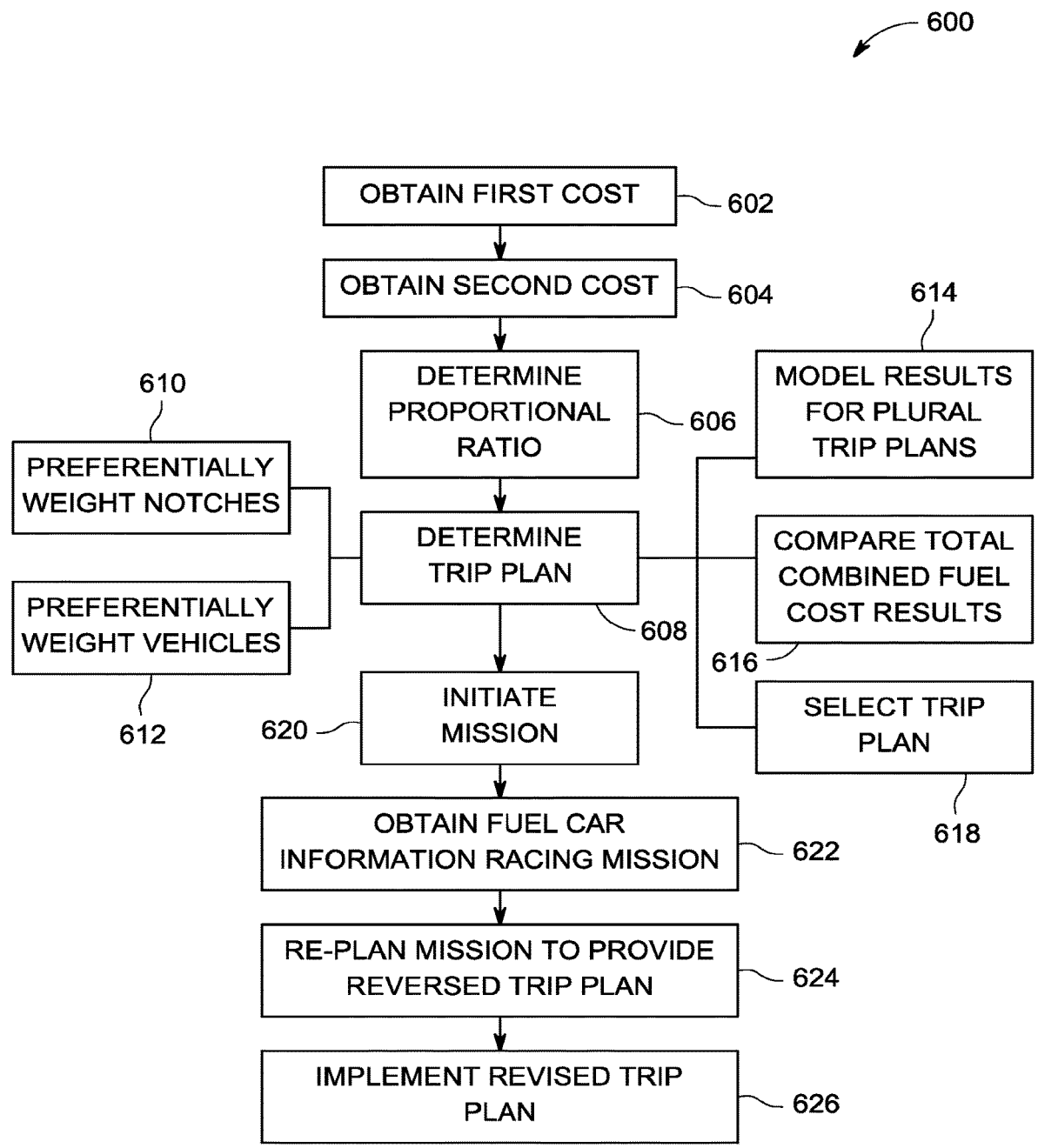
FIG. 6 is a flowchart of a method for determining a trip plan, according to an embodiment of the disclosure.

FIG. 6 illustrates a flowchart of a method 600 for determining a trip plan in accordance with one example of the present inventive subject matter. The method may be performed, for example, using certain components, equipment, structures, or other aspects of embodiments discussed above (e.g., the energy management processing unit 120 or similar processing unit). In certain embodiments, certain steps may be added or omitted, certain steps may be performed simultaneously or concurrently with other steps, certain steps may be performed in different order, and certain steps may be performed more than once, for example, in an iterative fashion. In various embodiments, portions, aspects, and/or variations of the method may be able to be used as one or more algorithms to direct hardware to perform operations described herein.

At 602, a first cost is obtained. The first cost in the illustrated example is of a first type of fuel (e.g., natural gas provided to a powered vehicle from one or more fuel cars or fuel tenders). The first cost may be on a per-volume basis (e.g., dollars per gallon). The first cost may be a current cost, or a projected cost corresponding to a time of replenishing a current fuel supply.

At 604, a second cost is obtained. The second cost in the illustrated example is of a second type of fuel (e.g., diesel fuel provided to a powered vehicle from a tank or reservoir disposed on-board the vehicle). The second cost, like the first cost, may be on a per-volume basis (e.g., dollars per gallon), and may be a current cost or a projected cost corresponding to a time of replenishing a current fuel supply. It may be noted that the first and second costs may be obtained (e.g., received) by a processing unit, such as processing unit disposed on-board a powered vehicle (e.g., energy management processing unit 120).

At 606, a proportional ratio of the first fuel and the second fuel for each of plural power settings available for use during performance of the mission is determined (e.g., by a processing unit such as the energy management processing unit 120). For example, a relative proportion of diesel fuel and natural gas may be determined for each notch setting of each powered vehicle in a consist. Thus, for each portion of the trip plan, a corresponding total amount of each fuel consumed may be determined using the proportion of fuel used at the notch setting and the time or distance for which the notch setting is used. Certain notch settings may be reserved for use with a single type of fuel, while other notch settings may use a predetermined mixture of fuel.

At 608, a trip plan is determined. The trip plan may specify power settings at various portions along a route for one or more powered vehicles. In the illustrated example, the trip plan is determined to minimize total combined fuel cost (e.g., cost of a first fuel consumed during the mission added to cost of a second fuel consumed during the mission) or to preferentially weight lowering total combined fuel cost relative to other objectives such as time to perform mission, amount of fuel consumed, fuel efficiency, emission levels, or the like. For example, diesel fuel may be more efficient resulting in less fuel used for higher proportions of consumed diesel, but the price differential between diesel and natural gas may result in lower total cost for higher proportions of consumed natural gas. The trip plan, for example, may be determined using one or more of sub-steps 610, 612, or 614-618.

At 610, notches or power settings are preferentially weighted. For example, the proportion of the first fuel consumed may be higher for a first group of notches, and the proportion of the second fuel consumed may be higher for a second group of notches. When the cost of the first fuel is relatively lower relative to the second fuel, the first group of notches corresponding to increased use of the first fuel may be preferentially weighted. Conversely, when the cost of the second fuel is relatively lower relative to the first fuel, the second group of notches corresponding to increased use of the second fuel may be preferentially weighted. For example, use of higher notch levels may be preferentially weighted by starting with an archived or other trip plan specifying notch setting to achieve an objective other than reduced total fuel cost, and adjusting the trip plan to utilize higher notch settings along one or more portions of the route. As another example, use of higher notch settings may be preferentially weighted by providing a weighting factor or coefficient to higher notch settings as part of a formula or relationship used to develop a trip plan. As one more example, the members of a group of proposed trip plans from which a trip plan may be selected may be populated by members having generally higher notch settings than trip plans configured to achieve a different objective than reduced total fuel cost to preferentially weight for higher notch settings.

At 612, use of different types of vehicles is preferentially weighted. For example, when the cost of natural gas is relatively low compared to diesel fuel, dual fuel vehicles may be preferentially weighted for increased use (e.g., higher notch settings) relative to vehicles configured to use only diesel fuel.

As indicated herein, the determination of a trip plan may include the selection of the trip plan from a group of potential trip plans. Substeps 614-618 depict an example of selection of a trip plan from a group of potential trip plans.

At 614, the results of plural trip plans performing the mission are obtained, for example using a model. One or more of the plural trip plans may be formed by modifying an archived or historical trip plan to preferentially weight one or more characteristics, such as notches or use of type of vehicle. It may be noted that the characteristics of some of the group may be weighted in a first direction or trend (e.g., use of higher notches, increased use of dual fuel vehicles) while the same characteristics of others of the group may be weighted in a different direction or trend (e.g., use of lower notches, increased use of diesel only vehicles). The model is used to obtain a total combined fuel cost for each of the potential trip plans. Optionally, additional results relating to time of performance of mission, emissions, or the like may be obtained. It may be noted that the selection of the proposed trip plans may be constrained to satisfy a threshold level for one or more objectives, such as a maximum allowed time to complete a mission, maximum allowed emission levels, or the like.

At 616, the total combined fuel cost resulting from each of the modeled potential trip plans is compared. In some embodiments, only the resulting combined fuel costs are compared. In other embodiments, additional factors or objectives such as time to perform mission and/or emission levels may be compared as part of a weighted function or weighted comparison (e.g., greater weight given to total combined fuel cost, but consideration given to one or more other factors or considerations.

At 618, the trip plan is selected. For example, the trip plan providing the lowest total combined fuel cost may be selected autonomously by a processing unit (e.g., energy management processing unit 120). As another example, the trip plan satisfying a weighted function or weighted comparison as discussed, for example, in connection with 616 may be selected. Further, a number of proposed trip plans providing generally good total combined fuel costs may be displayed to an operator (e.g., via display unit 140) along with one or more other results (e.g., total emissions), and the operator may select the trip plan from the displayed options.

At 620, the mission is initiated using the setting prescribed by the trip plan determined at 618.

At 622, fuel car information is obtained (e.g., via fuel car information unit 130). The fuel car information may describe, depict, or correspond to one or more operating conditions or states of one or more fuel cars in a consist. For example, a fuel car may be identified as no longer providing fuel.

At 624, the mission is re-planned, for example to account for the fuel car information obtained at 622. For example, for any fuel cars identified as no longer functioning or shut down, the trip plan may be modified to prevent the use of natural gas by powered vehicle configured to receive natural gas from the identified fuel cars. As another example, if a given fuel car is determined to have less fuel available than the amount demanded by the original or previous trip plan, the trip plan may be modified to reduce usage of natural gas by any powered vehicles supplied by the given fuel car.

At 626, the revised trip plan is implemented. For example, a processing unit or control unit (e.g., energy management processing unit 120) may provide control signals to one or more powered vehicles to operate pursuant to the settings prescribed by the revised trip plan during performance of the mission.

In one embodiment, a method may include adjusting a fuel combustion ratio for one or more vehicles executing a mission, wherein the one or more vehicles are included in a vehicle fleet. The fuel combustion ratio may be adjusted to allow each of the one or more vehicles to achieve a current lowest fuel combustion cost while still meeting other target values such as travel time to execute the mission, emission targets, and the like. Emissions targets may be based on local government standards set in various geofenced locations. Geofenced locations may include cities, rural areas, parks, schools, stadiums, and other locations of interest.

The vehicles may be autonomous, semi-autonomous, and/or user occupied and configured to combust a one or more fuels. At least one or more vehicles of the vehicle fleet may be configured to combust multiple fuels during a single engine cycle. The multiple fuels may include two or more of gasoline, diesel, hydrogenation-derived renewable diesel (HDRD), alcohol, ammonia, biodiesels, hydrogen, natural gas, kerosene, syn-gas, and propane.

Prior to beginning a mission, the energy management processor 120 may predict which fuels will be combusted by each of the vehicles of the vehicle fleet based on one or more of a route, weather, traffic, vehicle maintenance history, driver behavior, fuel costs, fuel levels, fuel wait times, fuel stations, and the like. The energy management processors of the vehicles may work in tandem to achieve an overall lowest total fuel cost for all the vehicles while still meeting emissions targets and desired travel times. As such, a cost of each of the plurality of fuels may be determined. The cost may be based on an average cost along the path along which the vehicle will travel.

As the vehicles perform the mission, fuel economy, engine conditions, and emissions values may be measured to determine if the predictions prior to the mission are accurate. If one or more conditions do not meet threshold values, such as an engine power output being less than an expected output, an engine temperature being outside a desired operating temperature range, and the like. If the predictions are not accurate, then a self-test may be initiated. In one example, if the vehicle may operate with only one of the multiple fuels, then the self-test may be executed. For example, if the self-test is executed with the first fuel and the self-test is passed, then the second fuel may be added to determine if the second fuel is degraded. Fuel may degrade due to aging, water contamination, or other condition. If the self-test with the first and second fuels passes, then another self-test may be executed with the first fuel and a third fuel. If the third fuel is degraded, then it may no longer be cost efficient for the vehicle to combust with the third fuel. As such, a fuel combustion ratio of the vehicle may be adjusted. If fuel emission targets are now being exceeded due to the adjusting fuel combustion ratio of the vehicle, then the fuel combustion ratio of other vehicles may also be adjusted to meet the emission targets.

If the self-test is not passed with the first fuel, then the first fuel may be degraded or one or more vehicle components may be degraded and maintenance may be requested. The vehicle may be instructed to refuel with the first fuel at a fuel station where a quality of fuel at the fuel station is greater than or equal to a baseline quality. The quality of fuel at the fuel station may be based on feedback from other vehicles that have refueled at the fuel station. Once the vehicle has refueled, the self-test may be performed again to determine if the fuel quality is less than the baseline quality or if one or more vehicle components are degraded. If one or more vehicle components are degraded, the vehicle may be signaled to receive maintenance and end the mission.

Thus, various examples of the inventive subject matter provide for improved trip planning to improve (e.g., reduce) the total cost of combined fuel used to perform a mission, in contrast to conventional system that may be configured to improve fuel efficiency, amount of fuel used, or the like. Additionally or alternatively, various examples of the present inventive subject matter also provide improved sharing and use of information between fuel cars (or fuel tenders) and powered vehicles.

In one example, the disclosure provides support for a system includes an energy management processor configured to obtain costs of a plurality of fuels used in a vehicle consist configured for multi-fuel operation and comprising at least one fuel car operably connectable to at least one powered vehicle via a fuel distribution path, determine a fuel combustion ratio of the plurality of fuels for each of a plurality of power settings available for use during performance of a mission of the vehicle consist along a route, determine a fuel cost for each of the plurality of power settings based on fuels of the plurality of fuels used for each of the plurality of power settings, determine a trip plan specifying power settings for sections of the route, wherein the trip plan further comprises selecting fuel combustion ratios corresponding to a lowest total combined fuel cost based on consumption of the plurality of fuels for each of the plurality of power settings, and control propulsion of the vehicle consist based on the trip plan. A first example of the system further includes where the plurality of fuels comprises two or more of gasoline, diesel, hydrogenation-derived renewable diesel (HDRD), alcohol, ammonia, biodiesels, hydrogen, natural gas, kerosene, syn-gas, and propane. A second example of the system, optionally including the first example, further includes where the fuel combustion ratio comprises at least a first fuel and a second fuel, wherein the first fuel is a liquid fuel and the second fuel is a gaseous fuel. A third example of the system, optionally including one or more of the previous examples, further includes where the fuel combustion ratio comprises at least a first fuel and a second fuel, wherein the first fuel comprises a first carbon content and the second fuel comprises a second carbon content less than the first carbon content. A fourth example of the system, optionally including one or more of the previous examples, further includes where an emission threshold and a desired travel time are met when the lowest total combined fuel cost is selected. A fifth example of the system, optionally including one or more of the previous examples, further includes where the energy management processor selects between use of at least two power settings based on a lowest total combined fuel cost in response to each of the at least two power settings meeting an emission threshold. A sixth example of the system, optionally including one or more of the previous examples, further includes where the energy management processor is configured to determine respective total fuel costs for multiple trip plans configured to execute the mission, and to select the trip plan based on the lowest total fuel cost. A seventh example of the system, optionally including one or more of the previous examples, further includes where the energy management processor is further configured to determine refueling wait times, fuel availability, emissions outputs, travel times, and fuel prices at fuel stations along routes of the multiple trip plans, and wherein refueling wait times, fuel availability, emissions outputs, and travel times meet respective thresholds for the selected trip plan. An eighth example of the system, optionally including one or more of the previous examples, further includes where the fuel cost for each of the plurality of fuels is based on a previous refueling cost and an estimated future refueling cost.

The disclosure further provides support for a method including adjusting a fuel combustion ratio of one or more vehicle consists of a fleet of vehicle consists in response to a self-test of a vehicle consist of the fleet not being passed. A first example of the method further includes where each vehicle consist of the fleet comprises a fuel car and a multi-fuel powered vehicle. A second example of the method, optionally including the first example, further includes where the self-test comprises operating the multi-fuel powered vehicle with a single fuel and comparing values of the multi-fuel powered vehicle to target values. A third example of the method, optionally including one or more of the previous examples, further includes where adjusting the fuel combustion ratio comprises increasing or decreasing an amount of at least one fuel included in the fuel combustion ratio, and wherein the adjusting is further based on a cost of the adjusted fuel combustion ratio. the cost is less than a cost of other fuel combustion ratios. A fourth example of the method, optionally including one or more of the previous examples, further includes where a total cost of fuel combustion ratios for vehicle consists of the fleet is less than total costs of other possible fuel combustion ratios.

The disclosure further provides support for a method including adjusting a plurality of fuel combustion ratios of a plurality of vehicle consists of a fleet in response to data received from a plurality of energy management processors, wherein the adjusting is based on a cost of each of a plurality of fuels included in the adjusted fuel combustion ratios. A first example of the method further includes where the adjusting is further based on a result of a self-test of one or more of the plurality of vehicle consists. A second example of the method, optionally including the first example, further includes where the adjusting further based on one or more of a refueling wait time, a fuel availability, emissions values in locations of the plurality of vehicle consists, and estimated travel times to complete a mission for each vehicle consist. A third example of the method, optionally including one or more of the previous examples, further includes where each of the plurality of vehicle consists comprises a fuel car operably connected to a powered vehicle via a fuel distribution path, and wherein the powered vehicle comprises a multi-fuel engine configured to combust two or more of gasoline, diesel, hydrogenation-derived renewable diesel (HDRD), alcohol, ammonia, biodiesels, hydrogen, natural gas, kerosene, syn-gas, and propane. A fourth example of the method, optionally including one or more of the previous examples, further includes where the plurality of fuel combustion ratios comprises at least a first fuel and a second fuel, wherein the first fuel comprises a greater amount of carbon than the second fuel.

In one example of the inventive subject matter, a system (e.g., a system in a vehicle consist configured for dual fuel operation and comprising at least one fuel car operably connectable to at least one powered vehicle via a fuel distribution path) includes an energy management processing unit. The energy management processing unit is configured to (e.g., includes processing circuitry configured to) obtain a first cost of a first fuel, obtain a second cost of a second fuel, and determine a proportional ratio of the first fuel and the second fuel for each of plural power settings available for use during performance of a mission along a route. The energy management processing unit is also configured to determine a trip plan specifying power settings for corresponding plural sections of the route to perform the mission using the first cost, the second cost, and the proportional ratio for each of the power settings to obtain a total combined cost of fuel used during the performance of the mission. The total combined cost of fuel may be optimized, for example, to minimize or reduce a total or overall fuel cost.

In one aspect, the vehicle consist includes a first group of at least one vehicle configured to use at least the first fuel and the second fuel and a second group of at least one vehicle configured to use only one of the first fuel or the second fuel. The energy management processing unit is configured to select between use of the first group and the second group to preferentially weight use of one of the first group or the second group based on a difference between the first cost of the first fuel and the second cost of the second fuel. It may be noted that, as used herein, selecting between use of two groups may not necessarily demand exclusive use of only one of the groups. Rather, a group that is selected may be used at a relatively higher level use than a group that is not selected.

In one aspect, the energy management processing unit is configured to select between use of at least two power settings to preferentially weight use of at least one setting based on a difference between the first cost of the first fuel and the second cost of the second fuel.

In one aspect, the system further comprises a fuel car information unit configured to obtain fuel car information from at least one of the at least one fuel car during the performance of the mission, wherein the energy management processing unit is configured to obtain the fuel car information from the fuel car information unit, and to re-plan the trip plan based on the received fuel car information.

In one aspect, the energy management processing unit is configured to determine a total mission fuel cost for each of plural potential trip plans, and to select the trip plan from the potential trip plans based on the total mission fuel cost.

In one aspect, the first fuel is natural gas and the second fuel is diesel.

In one example of the inventive subject matter, a method (e.g., a method in a vehicle consist configured for dual fuel operation and comprising at least one fuel car operably connectable to at least one powered vehicle via a fuel distribution path) is provided. The method includes obtaining, with at least one processor, a first cost of a first fuel. The method also includes obtaining, with the at least one processor, a second cost of a second fuel. Also, the method includes determining, with the at least one processor, a proportional ratio of the first fuel and the second fuel for each of plural power settings available for use during performance of a mission along a route. Further, the method includes determining, with the at least one processor, a trip plan specifying power settings for corresponding plural sections of the route to perform the mission using the first cost, the second cost, and the proportional ratio for each of the power settings to obtain a total combined cost of fuel used during the performance of the mission.

In one aspect, the vehicle consist includes a first group of at least one vehicle configured to use at least the first fuel and the second fuel and a second group of at least one vehicle configured to use only one of the first fuel or the second fuel, and the method further includes selecting between use of the first group and the second group to preferentially weight use of one of the first group or the second group based on one or both of a difference between the first cost of the first fuel and the second cost of the second fuel or a difference between a fuel efficiency of the first group relative to the second group.

In one aspect, the method further includes selecting between use of at least two power settings to preferentially weight use of at least one setting based on a difference between the first cost of the first fuel and the second cost of the second fuel.

In one aspect, the method further includes obtaining fuel car information from at least one of the at least one fuel car during the performance of the mission, and re-planning, during the performance of the mission, the trip plan based on the received fuel car information.

In one aspect, determining the trip plan comprises determining a total mission fuel cost for each of plural potential trip plans and selecting the trip plan from the potential trip plans based on the total mission fuel cost.

In one aspect, the first fuel is natural gas and the second fuel is diesel.

In one example of the inventive subject matter, a system (e.g., a system in a vehicle consist configured for dual fuel operation and comprising at least one fuel car operably connectable to at least one powered vehicle via a fuel distribution path) includes a fuel car information unit and a display unit. The fuel car information unit is configured to obtain fuel car information from at least one of the at least one fuel car. The display unit is configured to be disposed onboard one of the at least one powered vehicle and operably coupled to the fuel car information unit, and is configured to display at least a portion of the fuel car information.

In one aspect, the fuel car information unit is further configured to initiate a self-test by the at least one of the at least one fuel car.

In one aspect, the fuel car information obtained from the at least one of the at least one fuel car includes at least one of alarm information corresponding to a fault of the at least one of the at least one fuel car, operational information corresponding to an operational state of the at least one of the at least one fuel car, or statistical information corresponding to historic use of the at least one of the at least one fuel car.

In one aspect, the fuel car information unit includes an analysis unit configured to process raw information received from the at least one of the at least one fuel car to provide processed fuel car information.

In one aspect, the fuel car information unit is configured to compare a first value corresponding to first information received from the at least one of the at least one fuel car to a second value corresponding to second information obtained on-board the one of the at least one powered vehicle, and to determine that a fault or issue exists if the first value and second value are substantially different.

In one aspect, the fuel car information unit is configured to provide powered vehicle information to the at least one of the at least one fuel car.

In one aspect, the powered vehicle information includes downloadable software for configuring the at least one of the at least one fuel car for communication with the fuel car information unit.

In one aspect, the fuel car information unit is configured to convert a message received from the at least one of the at least one fuel car from a first format utilized by the at least one of the at least one fuel car to a second format utilized by the one of the at least one powered vehicle.

In one example, the disclosure provides support for a system including an energy management processing unit configured to obtain a first cost of a first fuel used in a vehicle consist configured for dual fuel operation and comprising at least one fuel car operably connectable to at least one powered vehicle via a fuel distribution path, obtain a second cost of a second fuel used in the vehicle consist; determine a proportional ratio of the first fuel and the second fuel for each of plural power settings available for use during performance of a mission of the vehicle consist along a route; and determine a trip plan specifying power settings for corresponding plural sections of the route to perform the mission using the first cost, the second cost, and the proportional ratio for each of the power settings to obtain a total combined cost of fuel used during the performance of the mission. A first example of the system further includes where the vehicle consist includes a first group of at least one vehicle configured to use at least the first fuel and the second fuel and a second group of at least one vehicle configured to use only one of the first fuel or the second fuel, wherein the energy management processing unit is configured to select between use of the first group and the second group to preferentially weight use of one of the first group or the second group based on a difference between the first cost of the first fuel and the second cost of the second fuel. A second example of the system, optionally including the first example, further includes where the energy management processing unit is configured to select between use of at least two of the power settings to preferentially weight use of at least one of the at least two of the power settings based on a difference between the first cost of the first fuel and the second cost of the second fuel. A third example of the system, optionally including one or more of the previous examples, further includes a fuel car information unit configured to obtain fuel car information from at least one of the at least one fuel car during the performance of the mission, wherein the energy management processing unit is configured to obtain the fuel car information from the fuel car information unit during performance of the mission, and to re-plan the trip plan based on the received fuel car information. A fourth example of the system, optionally including one or more of the previous examples, further includes where the energy management processing unit is configured to determine respective total mission fuel costs for plural potential trip plans, and to select the trip plan from the potential trip plans based on the total mission fuel costs. A fifth example of the system, optionally including one or more of the previous examples, further includes where the first fuel is natural gas and the second fuel is diesel.

The disclosure further provides support for a method, in a vehicle consist configured for dual fuel operation and comprising at least one fuel car operably connectable to at least one powered vehicle via a fuel distribution path, the method including obtaining, with at least one processor, a first cost of a first fuel; obtaining, with the at least one processor, a second cost of a second fuel; determining, with the at least one processor, a proportional ratio of the first fuel and the second fuel for each of plural power settings available for use during performance of a mission of the vehicle consist along a route; and determining, with the at least one processor, a trip plan specifying power settings for corresponding plural sections of the route to perform the mission using the first cost, the second cost, and the proportional ratio for each of the power settings to obtain a total combined cost of fuel used during the performance of the mission. A first example of the method further includes where the vehicle consist includes a first group of at least one vehicle configured to use at least the first fuel and the second fuel and a second group of at least one vehicle configured to use only one of the first fuel or the second fuel, the method further comprising selecting between use of the first group and the second group to preferentially weight use of one of the first group or the second group based on one or both of a difference between the first cost of the first fuel and the second cost of the second fuel or a difference between a fuel efficiency of the first group relative to the second group. A second example of the method, optionally including the first example, further includes selecting between use of at least two of the power settings to preferentially weight use of at least one of the at least two of the power settings based on a difference between the first cost of the first fuel and the second cost of the second fuel. A third example of the method, optionally including one or more of the previous examples, further includes obtaining fuel car information from at least one of the at least one fuel car during the performance of the mission, and re-planning, during the performance of the mission, the trip plan based on the received fuel car information. A fourth example of the method, optionally including one or more of the previous examples, further includes where determining the trip plan comprises determining respective total mission fuel costs for plural potential trip plans and selecting the trip plan from the potential trip plans based on the total mission fuel costs. A fifth example of the method, optionally including one or more of the previous examples, further includes where the first fuel is natural gas and the second fuel is diesel.

The disclosure further provides support for a system including a fuel car information unit configured to obtain fuel car information from at least one fuel car of a vehicle consist configured for dual fuel operation and comprising the at least one fuel car operably connectable to at least one powered vehicle via a fuel distribution path; and a display unit configured to be disposed onboard one of the at least one powered vehicle and operably coupled to the fuel car information unit, the display unit configured to display at least a portion of the fuel car information. A first example of the system further includes where the fuel car information unit is further configured to initiate a self-test by the at least one of the at least one fuel car. A second example of the system, optionally including the first example, further includes where the fuel car information obtained from the at least one of the at least one fuel car includes at least one of alarm information corresponding to a fault of the at least one of the at least one fuel car; operational information corresponding to an operational state of the at least one of the at least one fuel car; or statistical information corresponding to historic use of the at least one of the at least one fuel car. A third example of the system, optionally including one or more of the previous examples, further includes where the fuel car information unit includes an analysis unit configured to process raw information received from the at least one of the at least one fuel car to provide processed fuel car information. A fourth example of the system, optionally including one or more of the previous examples, further includes where the fuel car information unit is configured to compare a first value corresponding to first information received from the at least one of the at least one fuel car to a second value corresponding to second information obtained on-board the one of the at least one powered vehicle, and to determine that a fault or issue exists if the first value and second value are substantially different. A fourth example of the system, optionally including one or more of the previous examples, further includes where the fuel car information unit is configured to provide powered vehicle information to the at least one of the at least one fuel car. A fifth example of the system, optionally including one or more of the previous examples, further includes where the powered vehicle information includes downloadable software for configuring the at least one of the at least one fuel car for communication with the fuel car information unit. A sixth example of the system, optionally including one or more of the previous examples, further includes where the fuel car information unit is configured to convert a message received from the at least one of the at least one fuel car from a first format utilized by the at least one of the at least one fuel car to a second format utilized by the one of the at least one powered vehicle.

Various components and modules described herein may be implemented as part of one or more computers, computing systems, or processors. The computer, computing system, or processor may include a microprocessor. The microprocessor may be connected to a communication bus. The computer or processor may also include a memory. The memory may include Random Access Memory (RAM) and Read Only Memory (ROM). The computer or processor further may include a storage system or device, which may be a hard disk drive or a removable storage drive such as a floppy or other removable disk drive, optical disk drive, and the like. The storage system may also be other similar means for loading computer programs or other instructions into the computer or processor. The instructions may be stored on a tangible and/or non-transitory computer readable storage medium coupled to one or more servers. As used herein, the term "computer" or "computing system" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "computing system."

The set of instructions or modules may include various commands that instruct the controller, computer or processor as a processing machine to transform information and/or perform specific operations such as the methods and processes described herein. The set of instructions may be in the form of a software program. The software may be in the form of a collection of separate programs, a program module within a larger program or a portion of a program module. An example of modular programming may be in the form of object-oriented programming. The processing of input data by the processing machine may be in response to user commands, or in response to results of previous processing, or in response to a request made by another processing machine.

As used herein, the terms "system," "unit," and "module" include a hardware and/or software system that operates to perform one or more functions. For example, a system, unit, or module may include electronic circuitry that includes and/or is coupled to one or more computer processors, controllers, or other logic based devices that perform operations based on instructions stored on a tangible and non-transitory computer readable storage medium, such as a computer memory. Alternatively, a system, unit, or module may include a hard-wired device that performs operations based on hard-wired logic of the device. The systems, units, or modules shown in the attached figures may represent the hardware that operates based on software or hardwired instructions, the software that directs hardware to perform 0." the operations, or a combination thereof. "Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

This written description uses examples to disclose the invention and to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

The invention claimed is:

1. A system, comprising:
an energy management processor configured to:
obtain costs of a plurality of fuels used in a vehicle consist configured for multi-fuel operation and comprising at least one fuel car operably connectable to at least one powered vehicle via a fuel distribution path;
determine a fuel combustion ratio of the plurality of fuels for each of a plurality of power settings available for use during performance of a mission of the vehicle consist along a route;
determine a fuel cost for each of the plurality of power settings based on fuels of the plurality of fuels used for each of the plurality of power settings;
determine a trip plan specifying power settings for sections of the route, wherein the trip plan further comprises selecting fuel combustion ratios corresponding to a lowest total combined fuel cost based on consumption of the plurality of fuels for each of the plurality of power settings;
determine refueling wait times, fuel availability, emissions outputs, travel times, and fuel prices at fuel stations along the route of the trip plan; and
control propulsion of the vehicle consist based on the trip plan.

2. The system of claim 1, wherein the plurality of fuels comprises two or more of gasoline, diesel, hydrogenation-derived renewable diesel (HDRD), alcohol, ammonia, bio-diesels, hydrogen, natural gas, kerosene, syn-gas, and propane.

3. The system of claim 1, wherein the fuel combustion ratio comprises at least a first fuel and a second fuel, and wherein the first fuel is a liquid fuel and the second fuel is a gaseous fuel.

4. The system of claim 1, wherein the fuel combustion ratio comprises at least a first fuel and a second fuel, and wherein the first fuel comprises a first carbon content and the second fuel comprises a second carbon content less than the first carbon content.

5. The system of claim 1, further comprising where an emission threshold and a desired travel time are met when the lowest total combined fuel cost is selected.

6. The system of claim 1, wherein the energy management processor selects between use of at least two power settings based on the lowest total combined fuel cost in response to each of the at least two power settings meeting an emission threshold.

7. The system of claim 1, wherein the energy management processor is configured to determine respective total fuel costs for multiple trip plans configured to execute the mission, and to select the trip plan based on the lowest total combined fuel cost.

8. The system of claim 7, wherein the energy management processor is further configured to determine refueling wait times, fuel availability, emissions outputs, travel times, and fuel prices at fuel stations along routes of the multiple trip plans, and wherein refueling wait times, fuel availability, emissions outputs, and travel times meet respective thresholds for a selected trip plan.

9. The system of claim 1, wherein the fuel cost for each of the plurality of fuels is based on a previous refueling cost and an estimated future refueling cost.

* * * * *